United States Patent
Hong et al.

(10) Patent No.: US 11,166,409 B2
(45) Date of Patent: Nov. 9, 2021

(54) LAWN MOWER ROBOT

(71) Applicant: LG ELECTRONICS INC., Seoul (KR)

(72) Inventors: Woo Hong, Seoul (KR); Siyong Kim, Seoul (KR); Hanshin Kim, Seoul (KR); Hyunsup Song, Seoul (KR); Kyeongho Cho, Seoul (KR); Jaehun Han, Seoul (KR); Jiwoo Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 16/373,050

(22) Filed: Apr. 2, 2019

(65) Prior Publication Data

US 2019/0307061 A1 Oct. 10, 2019

Related U.S. Application Data

(60) Provisional application No. 62/653,568, filed on Apr. 6, 2018.

(30) Foreign Application Priority Data

Nov. 19, 2018 (KR) .......................... 10-2018-0142914

(51) Int. Cl.
*A01D 34/00* (2006.01)
*A01D 34/73* (2006.01)
(Continued)

(52) U.S. Cl.
CPC ......... *A01D 34/008* (2013.01); *A01D 34/736* (2013.01); *A01D 34/78* (2013.01); *A01D 34/81* (2013.01); *A01D 2101/00* (2013.01)

(58) Field of Classification Search
CPC .... A01D 34/008; A01D 34/376; A01D 34/78; A01D 34/81; A01D 2101/00
See application file for complete search history.

(56) References Cited

U.S. PATENT DOCUMENTS 2,464,912 A 3/1949 White
3,114,229 A 12/1963 Wilson
(Continued)

FOREIGN PATENT DOCUMENTS

| AU | 2015418271 | 6/2017 |
|----|-----------|--------|
| CN | 102523841 | 7/2012 |

(Continued)

OTHER PUBLICATIONS

European Search Report dated Aug. 22, 2019 issued in EP Application No. 19152775.3.
(Continued)

*Primary Examiner* — Abigail A Risic
(74) *Attorney, Agent, or Firm* — Ked & Associates, LLP

(57) ABSTRACT

A lawn mower robot includes an outer cover, an inner body positioned in the outer cover and having a plurality of wheels for traveling provided on both side surfaces thereof, a plurality of blades rotatably mounted on a bottom surface of the inner body to cut grass, electric devices mounted inside the inner body and including a battery, wheel driving motors, a blade driving motor, a plurality of ultrasonic sensor modules, rain sensors, a user interface (UI) module, and a universal serial bus (USB) port, and a waterproof unit to prevent penetration of water into the inner body or the electric devices, thereby improving waterproof performance.

20 Claims, 13 Drawing Sheets

(51) Int. Cl.
*A01D 34/78* (2006.01)
*A01D 34/81* (2006.01)
*A01D 101/00* (2006.01)

(56) References Cited

U.S. PATENT DOCUMENTS

| | | | |
|---|---|---|---|
| 4,194,345 A | 3/1980 | Pioch et al. | |
| 4,835,952 A | 6/1989 | McLane | |
| 5,259,175 A | 11/1993 | Schmidt | |
| 6,470,588 B1 | 10/2002 | Pilger | |
| 6,999,850 B2* | 2/2006 | McDonald | A47L 9/009 |
| | | | 700/245 |
| 7,171,799 B2 | 2/2007 | Takeishi et al. | |
| 8,234,848 B2* | 8/2012 | Messina | A01D 34/81 |
| | | | 56/17.1 |
| 8,336,282 B2 | 12/2012 | Messina et al. | |
| 8,387,193 B2 | 3/2013 | Ziegler et al. | |
| 9,021,777 B2* | 5/2015 | Johnson | B60L 1/003 |
| | | | 56/320.1 |
| 9,027,189 B2 | 5/2015 | Hickenbottom et al. | |
| 9,807,930 B1 | 11/2017 | Lydon et al. | |
| 10,299,432 B1 | 5/2019 | Kelly et al. | |
| 10,375,880 B2* | 8/2019 | Morin | B25J 5/007 |
| 10,555,457 B2 | 2/2020 | Song et al. | |
| 2005/0021181 A1 | 1/2005 | Kim et al. | |
| 2005/0044836 A1 | 3/2005 | Goto et al. | |
| 2012/0023880 A1* | 2/2012 | Messina | A01D 34/81 |
| | | | 56/10.2 E |
| 2012/0023887 A1* | 2/2012 | Messina | B60L 50/66 |
| | | | 56/320.1 |
| 2013/0061417 A1 | 3/2013 | Vanderstegen-Drake et al. | |
| 2013/0291506 A1 | 11/2013 | Johnson et al. | |
| 2014/0216424 A1 | 8/2014 | Gartzke et al. | |
| 2015/0271991 A1 | 10/2015 | Balutis | |
| 2016/0000007 A1 | 1/2016 | Bian et al. | |
| 2016/0014956 A1 | 1/2016 | Matsumoto et al. | |
| 2016/0081526 A1 | 3/2016 | Gottinger et al. | |
| 2016/0128275 A1 | 5/2016 | Johnson | |
| 2016/0278287 A1 | 9/2016 | Kasai et al. | |
| 2016/0338262 A1 | 11/2016 | Liu et al. | |
| 2017/0181375 A1* | 6/2017 | Hashimoto | A01D 34/81 |
| 2018/0116109 A1 | 5/2018 | Matsumoto | |
| 2018/0184583 A1* | 7/2018 | Morin | A01D 34/008 |
| 2018/0184585 A1 | 7/2018 | Song et al. | |
| 2018/0199506 A1* | 7/2018 | Ito | A01D 34/81 |
| 2018/0235146 A1* | 8/2018 | Hashimoto | A01D 34/008 |
| 2018/0271014 A1* | 9/2018 | Matsuzawa | A01D 34/008 |
| 2019/0216012 A1 | 7/2019 | Hahn et al. | |
| 2019/0223376 A1 | 7/2019 | Lee et al. | |
| 2019/0258267 A1 | 8/2019 | Hahn et al. | |
| 2019/0278269 A1 | 9/2019 | He et al. | |
| 2020/0170186 A1 | 6/2020 | Curtis | |

FOREIGN PATENT DOCUMENTS

| | | |
|---|---|---|
| CN | 102934565 | 2/2013 |
| CN | 105746094 | 7/2016 |
| CN | 206808075 | 12/2017 |
| DE | 20 2013 006712 | 10/2013 |
| DE | 20 2012 102 637 | 12/2013 |
| DE | 10 2013 212 605 | 12/2014 |
| DE | 10 2015 221 128 | 5/2016 |
| EP | 2 412 219 | 2/2012 |
| EP | 2 425 700 | 3/2012 |
| EP | 2 656 718 | 10/2013 |
| EP | 2 656 720 | 10/2013 |
| EP | 2 803 255 | 11/2014 |
| EP | 2 997 869 | 3/2016 |
| EP | 03222132 | 9/2017 |
| EP | 2 687 077 | 12/2017 |
| EP | 3 315 000 | 5/2018 |
| EP | 3 513 644 | 7/2019 |
| JP | 2012-105557 | 6/2012 |
| JP | 3180497 | 12/2012 |
| JP | 2013-000028 | 1/2013 |
| JP | 2016-049048 | 4/2016 |
| JP | 2016-123364 | 7/2016 |
| JP | 2016-185099 | 10/2016 |
| JP | 2016-208886 | 12/2016 |
| JP | 2016-208950 | 12/2016 |
| JP | 2017-118842 | 7/2017 |
| JP | 2017-154567 | 9/2017 |
| KR | 10-1997-0039324 | 7/1997 |
| KR | 20-1998-0002204 | 3/1998 |
| KR | 10-2005-0081398 | 8/2005 |
| KR | 10-2011-0110034 | 10/2011 |
| KR | 10-2015-0125508 | 11/2015 |
| KR | 10-2018-0079799 | 7/2018 |
| KR | 10-1915547 | 11/2018 |
| WO | WO 2017/051663 | 3/2017 |
| WO | WO 2017/109877 | 6/2017 |
| WO | WO 2017/109879 | 6/2017 |
| WO | WO 2018/001358 | 1/2018 |
| WO | WO 2018/125222 | 7/2018 |

OTHER PUBLICATIONS

European Search Report dated Aug. 22, 2019 issued in EP Application No. 19167018.1.
European Search Report dated Aug. 22, 2019 issued in EP Application No. 19152520.3.
European Search Report dated Aug. 22, 2019 issued in EP Application No. 19166925.8.
European Search Report dated Aug. 26, 2019 issued in EP Application No. 19167302.9.
European Search Report dated Sep. 2, 2019 issued in EP Application No. 19167046.2.
European Search Report dated Sep. 2, 2019 issued in EP Application No. 19167334.2.
European Search Report dated Sep. 2, 2019 issued in EP Application No. 19167328.4.
Australian Office Action dated Sep. 13, 2019 issued in AU Application No. 2019200604.
European Search Report dated Dec. 17, 2019 issued in EP Application No. 19167046.2.
United States Office Action dated Mar. 4, 2021 issued in U.S. Appl. No. 16/260,865.
United States Office Action dated Mar. 4, 2021 issued in U.S. Appl. No. 16/264,494.
Korean Notice of Allowance dated Jan. 5, 2021 issued in KR Application No. 10-2018-0121333.
Korean Notice of Allowance dated Nov. 23, 2020 issued in KR Application No. 10-2018-0123916.
Korean Notice of Allowance dated Dec. 8, 2020 issued in KR Application No. 10-2018-0142916.
Korean Notice of Allowance dated Dec. 8, 2020 issued in KR Application No. 10-2018-0142917.
Korean Office Action dated May 15, 2020 issued in KR Application No. 10-2018-0123916.
Korean Office Action dated May 25, 2020 issued in KR Application No. 10-2018-0127707.
Korean Office Action dated Jun. 12, 2020 issued in KR Application No. 10-2018-0142914.
Korean Office Action dated Jun. 12, 2020 issued in KR Application No. 10-2018-0142916.
Korean Office Action dated Jun. 12, 2020 issued in KR Application No. 10-2018-0142917.
Korean Office Action dated Jun. 12, 2020 issued in KR Application No. 10-2018-0142918.
Korean Notice of Allowance dated Nov. 26, 2020 issued in Application No. 10-2018-0121331.
Korean Notice of Allowance dated Dec. 2, 2020 issued in Application No. 10-2018-0142918.
Korean Notice of Allowance dated Nov. 23, 2020 issued in Application No. 10-2018-0127707.
United States Office Action dated Mar. 11, 2021 issued in U.S. Appl. No. 16/375,400.

(56) References Cited

OTHER PUBLICATIONS

United States Office Action dated Mar. 16, 2021 issued in U.S. Appl. No. 16/375,217.
United States Notice of Allowance dated Apr. 1, 2021 issued in U.S. Appl. No. 16/375,294.
United States Office Action dated Apr. 9, 2021 issued in U.S. Appl. No. 16/375,505.
United States Office Action dated Apr. 12, 2021 issued in U.S. Appl. No. 16/375,424.
U.S. Appl. No. 16/260,865, filed Jan. 29, 2019.
U.S. Appl. No. 16/264,494, filed Jan. 31, 2019.
U.S. Appl. No. 16/373,050, filed Apr. 2, 2019.
U.S. Appl. No. 16/375,424, filed Apr. 4, 2019.
U.S. Appl. No. 16/375,505, filed Apr. 4, 2019.
U.S. Appl. No. 16/375,217, filed Apr. 4, 2019.
U.S. Appl. No. 16/375,294, filed Apr. 4, 2019.
U.S. Appl. No. 16/375,400, filed Apr. 4, 2019.

* cited by examiner

LAWN MOWER ROBOT

CROSS-REFERENCE TO RELATED APPLICATIONS

Pursuant to 35 U.S.C. 119(a), this application claims the benefit of the earlier filing date and the right of priority to U.S. Provisional Application No. 62/653,568, filed on Apr. 6, 2018, and Korean Patent Application No. 10-2018-0142914, filed on Nov. 19, 2018, whose entire disclosures are hereby incorporated by reference. This application is also related to U.S. patent application Ser. No. 16/260,865 filed on Jan. 29, 2019, U.S. patent application Ser. No. 16/264,494 filed on Jan. 31, 2019, U.S. application Ser. No. 16/375,424 filed Apr. 4, 2019, U.S. application Ser. No. 16/375,505 filed Apr. 4, 2019, U.S. application Ser. No. 16/375,217 filed Apr. 4, 2019, U.S. application Ser. No. 16/375,294 filed Apr. 4, 2019, and U.S. application Ser. No. 16/375,400 filed Apr. 4, 2019.

BACKGROUND

1. Field

The present invention relates to a lawn mower robot for mowing grass with blades rotated by a motor.

2. Background

A lawn mower is a machine that cuts, mows or shaves grass growing in a yard at home, a playground, a golf course and the like. Recently, automated robot-type lawn mowers are under development to eliminate the user's burden to directly operate the lawn mower to cut lawns, and reduce additional costs caused due to employing a person to mow the lawns. The lawn mower robot may travel or move by rotating a plurality of wheels using electric motors mounted on both front and rear sides of a robot body, and a travel direction of the robot may be controlled by controlling the number of revolutions (Revolution per minute; RPM) of the electric motors.

A lawn mower robot is described in Korean Patent Application No. 10-2017-0000416, filed on Jan. 2, 2017. The lawnmower robot of the registered Korean patent application is configured in a manner that motors are mounted in an inner body and blades are rotated using power of the motors to mow lawns.

On the other hand, since the lawn mower robot is used outdoors, there is a risk that water penetrates into the lawn mower robot when it is raining, the robot is cleaned with water, or the robot is traveling over a puddle filled with water. However, in this case, water may penetrate into electric parts such as an ultrasonic sensor module, a battery, a motor, a display, a control panel, and the like, which are mounted inside the lawn mower robot, and thereby damage the electric parts, resulting in malfunction and breakdown of the robot.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
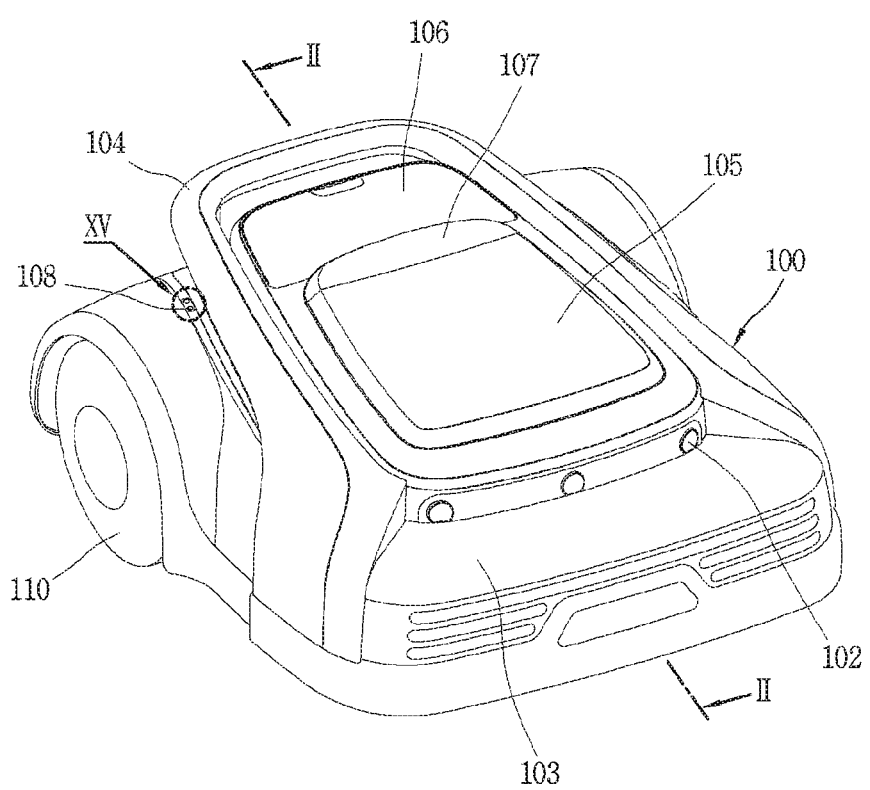
FIG. 1 is a perspective view illustrating appearance of a lawn mower robot in accordance with the present disclosure.
Figure 2:
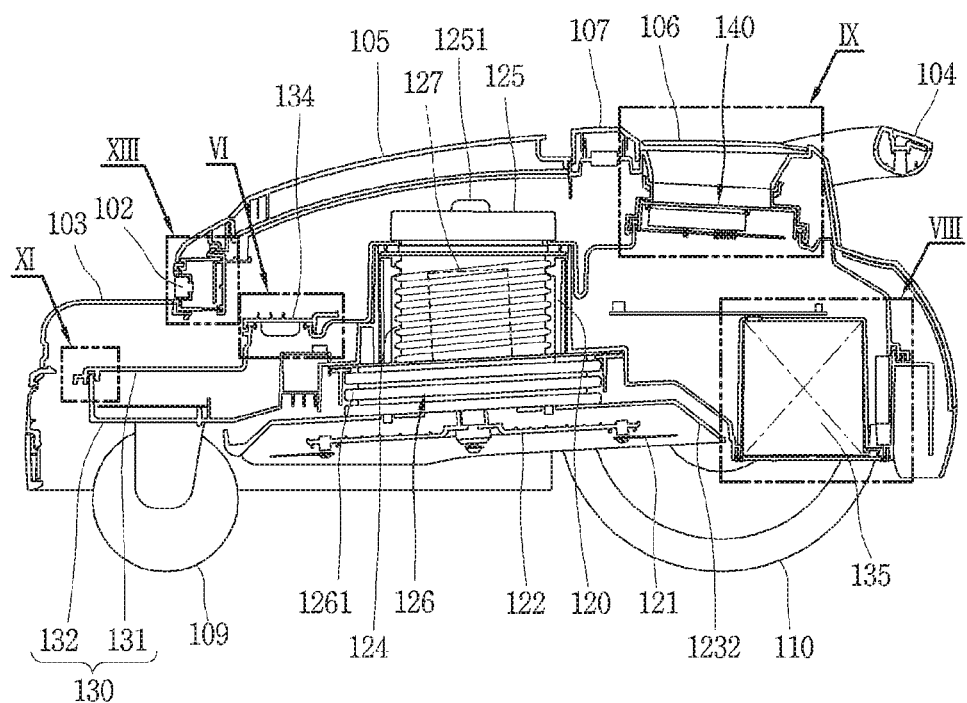
FIG. 2 is a sectional view taken along the line II-II in FIG. 1.
Figure 3:
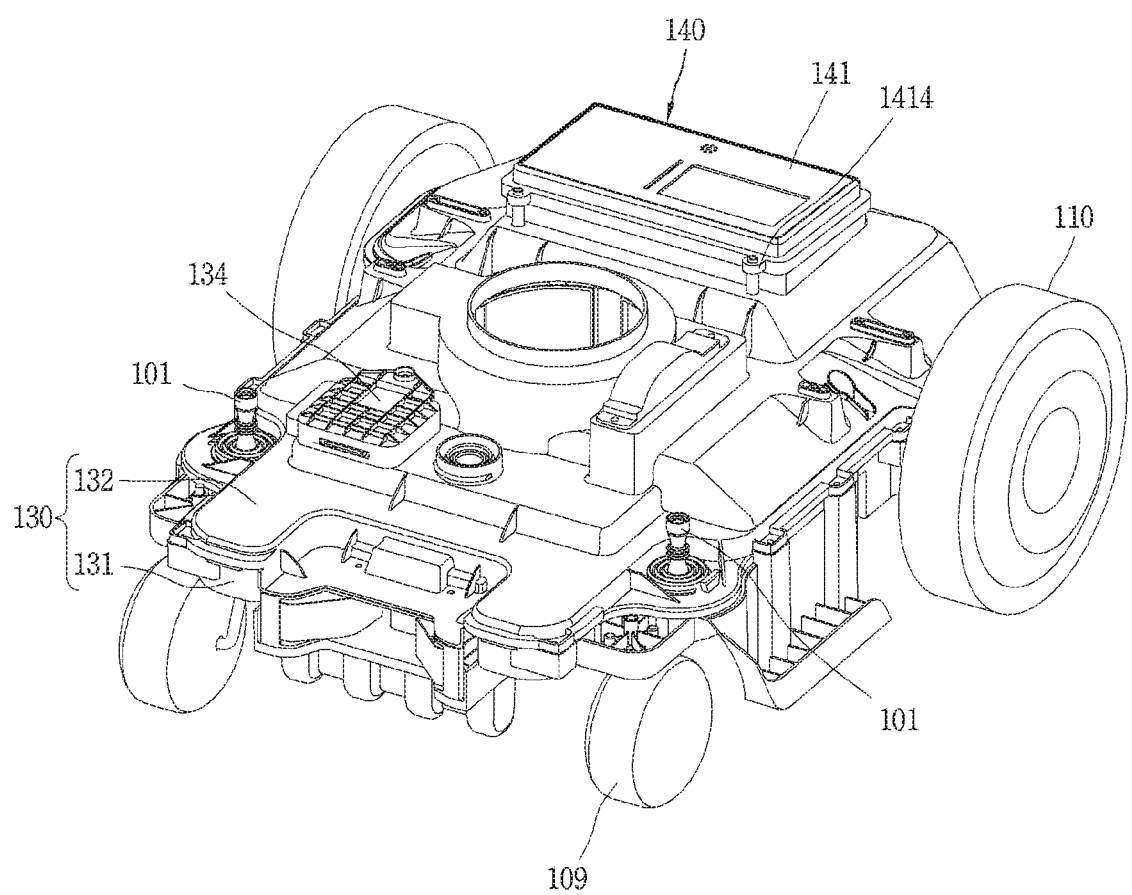
FIG. 3 is a conceptual view illustrating an inner body after detaching an outer cover in FIG. 1.

FIG. 1 is a perspective view illustrating appearance of a lawn mower robot in accordance with the present disclosure, FIG. 2 is a sectional view taken along the line II-II in FIG. 1, and FIG. 3 is a conceptual view illustrating an inner body (or inner frame) 130 after detaching an outer cover 100 in FIG. 1.

A lawn mower robot according to the present disclosure includes an outer cover 100 and an inner body 130. The outer cover 100 is configured to enclose the inner body 130. The inner body 130 may be accommodated inside the outer cover 100. The outer cover 100 may be supported by a plurality of supporting portions 101 to be movable back and forth and to the right and left with respect to the inner body 130.

The plurality of supporting portions 101 may be disposed on an upper portion of the inner body 130 to be spaced apart from one another in front, rear, left, and right directions. For example, two front supporting portions 101 may be disposed on a front side of the inner body 130 with being spaced apart from each other in a width direction, and two rear supporting portions 101 may be disposed on a rear side of the inner body 130 with being spaced apart from each other in the width direction.

Each of the plurality of supporting portions 101 may be made of a rubber material. Each of the plurality of supporting portions 101 may be formed in a cylindrical bar shape which is long in a vertical (or up-and-down) direction, and may have a sectional area that is narrowed from an upper end part to a middle part or from a lower end part to the middle part.

Each of the plurality of supporting portions 101 may have an upper end part coupled to the outer cover 100 and a lower end part coupled to the inner body 130. The front supporting portions 101 of the plurality of supporting portions 101 may have a wrinkle portion radially extending in a bellows shape from its lower end part. The front supporting portions 101 may elastically support the outer cover 100 so as to be movable in the front, rear, left, and right directions with respect to the inner body 130 by the wrinkle portion.

The rear supporting portions 101 may elastically support the outer cover 100 as its upper end part is bent with respect to the lower end part in the front, rear, left, and right directions. When the outer cover 100 collides with an obstacle, the outer cover 100 may move in the front, rear, left, and right directions with respect to the inner body 130, thereby mitigating collision impact.

A plurality of ultrasonic sensor modules 102 may be mounted on a front side of the outer cover 100. The plurality of ultrasonic sensor modules 102 may be spaced apart from one another in a width direction. Each of the plurality of ultrasonic sensor modules 102 may send an ultrasonic wave and receive a reflected wave by an obstacle located in front of the ultrasonic sensor module 102, so as to detect the obstacle.

An ultrasonic guide portion 103 may be formed in a planar shape on the front of the outer cover 100. The ultrasonic guide portion 103 may extend forward from a lower portion of the plurality of ultrasonic sensor modules 102, so that the ultrasonic waves are emitted from the plurality of ultrasonic sensor modules 102 at a predetermined height or higher.

A handle 104 may be provided on a top of the outer cover so that a user can grip the handle 104 to carry the robot. The handle 104 may be provided with front coupling portions, middle inclined portions, and a rear grip portion.

The front coupling portions are respectively coupled to both side surfaces of the front of the outer cover 100, and the middle inclined portions may extend upwardly from the front coupling portions in an inclined manner. The rear grip portion may be a portion that the user grips by hand and may connect rear ends of the middle inclined portions.

A first top cover 105 and a second top cover 106 may be mounted on a top of the outer cover 100 to be opened and closed. Each of the first top cover 105 and the second top cover 106 may be provided with a front end portion coupled to the inner body 130 with a hinge, and a rear end portion mounted to be rotatable up and down.

The first top cover 105 may be inclined downward from the rear end portion to the front end portion so that the front end portion is lower than the rear end portion in a lengthwise direction. The first top cover 105 may be inclined downward from a central portion to right and left end portions so that the right and left end portions are lower than the central portion in a widthwise direction. With this configuration, the first top cover 105 and the second top cover 106 can guide rainwater to flow downward to outside without being collected on the top of the outer cover 100 when it is raining.

A stop switch 107 may be provided between the first top cover 105 and the second top cover 106 so as to be manipulated in a pressing manner. The stop switch 107 may be used by the user in an emergency. The stop switch 107 may be positioned slightly higher than the first and second top covers 105 and 106 and positioned at the same position as the rear grip portion of the handle 104.

With this configuration, when the robot passes an obstacle such as a branch or the like, which is located as low as a height of the robot, the stop switch 107 may be brought into contact with the obstacle earlier than the rear grip portion of the handle 104. Responsive to the contact with the obstacle, the stop switch 107 may be pressed and the robot may be stopped. This can prevent the handle 104 from being caught by the obstacle.

A rain sensor 108 may be provided on one side of the upper portion of the outer cover 100 to sense rain when it rains. According to this configuration, the lawn mower robot can sense rain through the rain sensor 108 and return to a charging station.

The rain sensor 108 may be provided in plurality. When raindrops are brought into contact with the rain sensor 108, the rain sensor 108 may sense a change in capacitance due to impact and contact of the raindrops, thereby detecting an amount of raindrops.

Wheel driving motors 149 may be mounted on both sides of the inner body 130 for traveling the robot. The wheel driving motor 149 may have a driving shaft, and a wheel 110 may be connected to the driving shaft. A plurality of wheels 110 may be rotated by receiving rotational force from the wheel driving motors 149 through the driving shafts.

The plurality of wheels 110 may be driven independently by the wheel driving motors 149. The plurality of wheel driving motors 149 may be independently connected to the plurality of wheels 110, and the number of turns or revolutions (revolution per minute (RPM)) may be controlled differently by a control unit.

A plurality of casters 109 may be mounted on a bottom surface of the inner body 130 so as to be pivotable in a right and left direction about a central shaft extending perpendicularly. With this configuration, the control unit can control the plurality of wheel driving motors 149 to control the RPMs of the wheels 110 differently, so that the robot can travel in a desired direction.

The lawn mower robot may be provided with a blade assembly inside the inner body 130 to cut grass. The blade assembly may be disposed at a central portion of the inner body 130. The blade assembly may include an elevating frame 120, a plurality of blades 121, a rotating plate 122, a blade protection cover 123, a rotating cylindrical portion 124, a height adjustment knob 125, and the like.

The blade assembly may be positioned below the first top cover 105. When the first top cover 105 is opened, the height adjustment knob 125 of the blade assembly can be seen by the user. The user can adjust the height of the blades 121 using the height adjustment knob 125.

The elevating frame 120 may be provided in the inner body 130 to be movable up and down. The rotating plate 122 may be rotatably mounted on a bottom surface of the elevating frame 120. The blade driving motor 127 may be mounted inside the elevating frame 120.

The plurality of blades 121 and the rotating plate 122 may be rotatably disposed on the bottom surface of the inner body 130. The blade protection cover 123 may be disposed on the bottom surface of the inner body 130 and may be disposed to cover the rotating plate 122 and the plurality of blades 121.

A motor shaft may protrude from a lower portion of the blade driving motor 127 so as to be coupled to a shaft coupling portion, which is formed on a central portion of the rotating plate 122. The rotating plate 122 may be rotated by receiving driving force from the blade driving motor 127.

The plurality of blades 121 may be rotatably mounted on the bottom surface of the rotating plate 122. Each of the plurality of blades 121 may have one end portion coupled to the rotating plate 122 by a coupling bolt in a hinging manner, and another end portion rotatable centering on the coupling bolt so as to be folded (turned) inwardly in a radial direction of the rotating plate 122 or unfolded (turned) outwardly in the radial direction of the rotating plate 122. With this configuration, the plurality of blades 121 can cut grass while rotating together with the rotating plate 122 when the robot is traveling.

The blade protection cover 123 may be provided on the bottom surface of the elevating frame 120 to as to be movable up and down together with the elevating frame 120. The rotating plate 122 and the plurality of blades 121 may be accommodated in the blade protection cover 123. The rotating plate 122 may be disposed below an upper surface of the blade protection cover 123 in a spacing manner so as to be rotatable with respect to the blade protection cover 123. The blade protection cover 123 may be provided at the front thereof with a plurality of protrusions 1231 and a plurality of grass inlet openings 1233, and the plurality of protrusions 1231 and the plurality of grass inlet openings 1233 may be alternately disposed to be spaced apart from each other.

The blade protection cover 123 may be provided with inclined portions 1232 on right and left side surfaces and a rear surface. The inclined portions 1232 may extend from an upper surface of the blade protection cover 123 to be downwardly inclined. With this configuration, the inclined portions 1232 and the plurality of protrusions 1231 can prevent debris of stone, which is generated when each blade 121 collides with the stone or the like and then scattered in left, right and rear directions, from bouncing off the outer cover 100 to outside. In addition, the plurality of grass inlet openings can minimize resistance of grass when the grass is introduced from the front of the blade protection cover 123.

The plurality of blades 121, the rotating plate 122, and the blade protection cover 123 may be mounted to be movable up and down together with the elevating frame 120, so that the height of the plurality of blades 121 can be adjusted. To adjust the height of the blades 121, the height adjustment knob 125 may be mounted on a top of the inner body 130 to be rotatable in place. A knob portion 1251 may protrude from an upper surface of the height adjustment knob 125 and diametrically extend, so that the user can rotate the height adjustment knob 125 while holding the knob portion 1251.

The rotating cylindrical portion 124 may be coupled to a lower portion of the height adjustment knob 125 and mounted to be rotatable together with the height adjustment knob 125. Male screw portions may be formed on an outer circumferential surface of the rotating cylindrical portion 124. The rotating cylindrical portion 124 may be accommodated in the elevating frame 120. A falling restriction portion may be provided on an upper end part of the rotating cylindrical portion 124 and rotatably mounted on the upper portion of the inner body 130.

A plurality of spiral protrusions may be formed on an inner circumferential surface of the elevating frame 120, and the spiral protrusions may be engaged with the male screw portions of the rotating cylindrical portion 124. The rotation restriction portions may protrude from both sides of an outer circumferential surface of the elevating frame 120, so that the elevating frame 120 can be allowed to move up and down with being restricted from rotating. With this configuration, the spiral protrusions can move up and down along the male screw portions as the rotating cylindrical portion 124 rotates.

A blade sealing portion (or blade seal or gasket) 126 may be interposed between the lower portion of the inner body 130 and the bottom surface of the elevating frame 120. An upper end part of the blade sealing portion 126 may be coupled to the lower portion of the inner body 130 and a lower end part of the blade sealing portion 126 may be coupled to the bottom surface of the elevating frame 120 together with the blade protection cover 123.

A bellows-shaped wrinkle portion (or corrugated tube) 1261 may extend from a side surface of the blade sealing portion 126 to be adjustable in length in an up and down direction. According to this configuration, the wrinkle portion 1261 can be adjusted in length in the up and down direction by being folded or unfolded in a lengthwise direction. Accordingly, water tightness can be maintained between the lower portion of the inner body 130 and the blade protection cover 123 even though the blade protection cover 123, the rotating plate 122, and the plurality of blades move up and down together with the elevating frame 120, which may result in preventing damage to the blade driving motor 127 due to penetration of water into the inner body 130, for example, the elevating frame 120 at the lower portion of the inner body 130.

The inner body 130 may include an inner body main part (or inner frame main carriage or main body) 131 and an inner body cover (or inner frame cover) 132. An accommodating space may be formed in the inner body main part 131. The inner body cover 132 may be mounted so as to cover an upper portion of the inner body main part 131.

Semiconductor devices such as an inverter and the like for driving motors and electric devices such as a PCB or the like on which the semiconductor devices are mounted may be disposed inside the inner body 130, and wires may electrically connect such various types of electric devices.

A controller for controlling the blade driving motor 127 and the wheel driving motors 149 may be mounted inside the inner body 130. The controller may control an overall operation of the lawn mower robot. The controller may be implemented as a central processing unit (CPU) capable of processing data. Various software (SOFTWARE) may be installed in the CPU.

Figure 4:
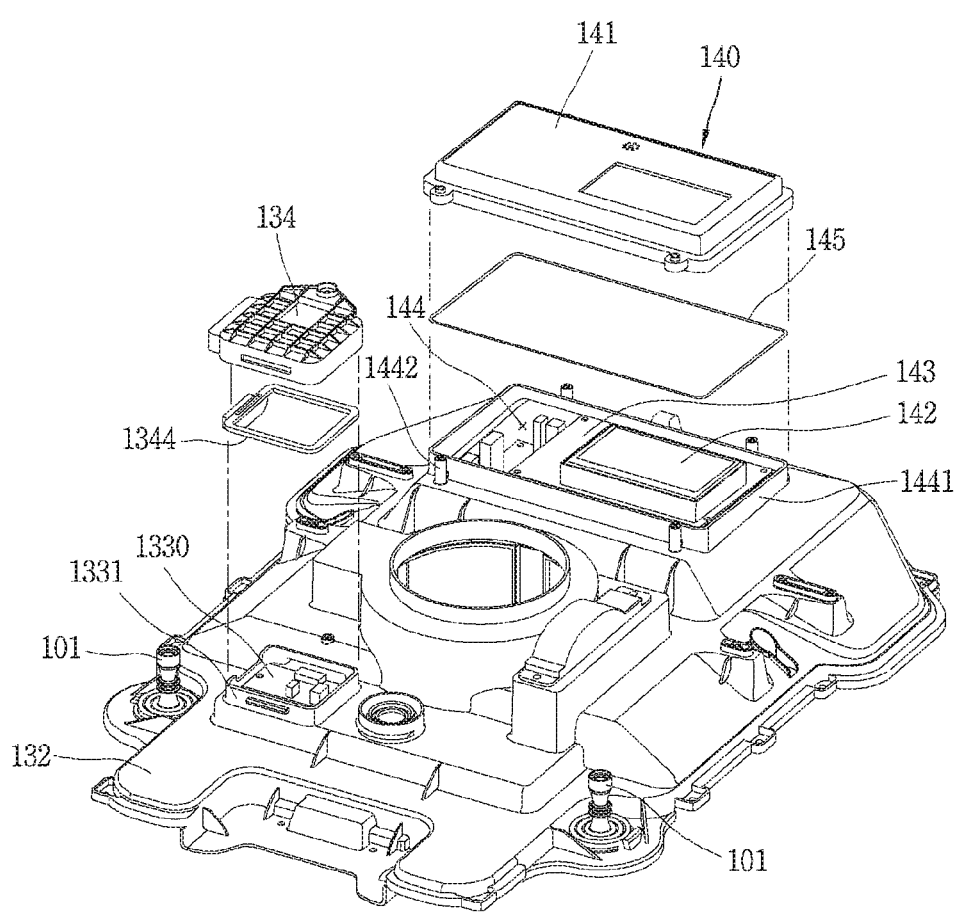
FIG. 4 is a conceptual view illustrating a state where a connector cover and a UI module are disassembled from an inner body cover in FIG. 3.
Figure 5:
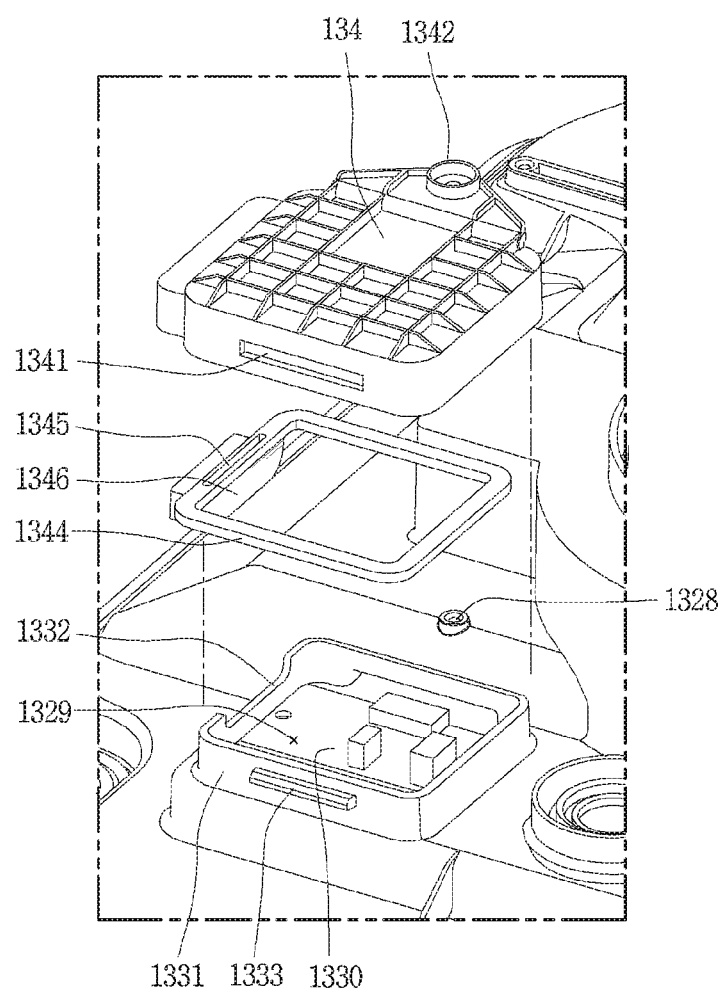
FIG. 5 is a conceptual view illustrating a state where the connector cover is disassembled from the inner body in FIG. 4.
Figure 6:
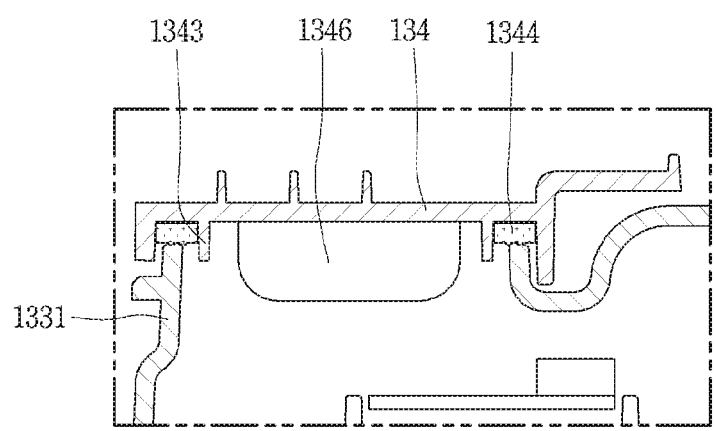
FIG. 6 is a sectional view illustrating a waterproof structure of the connector cover taken along the line XIII-XIII in FIG. 3.

FIG. 4 is a conceptual view illustrating a state where a connector cover 134 and a UI module 140 are disassembled from the inner body cover 132 in FIG. 3, FIG. 5 is a conceptual view illustrating a state where the connector cover 134 is disassembled from the inner body 130 in FIG. 4, and FIG. 6 is a sectional view illustrating a waterproof structure of the connector cover 134 taken along the line XIII-XIII in FIG. 3.

An opening 1329 may formed in the front of the inner body cover 132 and the connector cover 134 may be detachably mounted to cover the opening 1329. The user may connect a connector or wire to a CPU or the like mounted inside the inner body 130 through the opening 1329 during maintenance or a universal serial bus (USB) port (or port) may be formed on the PCB 1330. By inserting a USB into the USB port through the opening 1329, the user can continuously update software.

A waterproof rib (or rib) 1331 may protrude upward along a periphery of the opening 1329. The waterproof rib 1331 may be formed in a rectangular box shape. A cutout portion 1332 may be formed on one side of the waterproof rib 1331. The connector cover 134 may be mounted to cover an upper portion of the waterproofing rib 1331. A coupling protrusion 1333 may extend in a right and left direction from one side surface of the waterproof rib 1331 and protrude forward. The connector cover 134 may be provided with a coupling hole 1341 formed through one side surface of the connector cover 134 and extending in the right and left direction to correspond to the coupling protrusion 1333.

The connector cover 134 may be provided with a coupling portion (or coupling tab) 1342 on a rear part thereof and a coupling hole may be formed through the coupling portion 1342. The inner body cover 132 may be provided with a boss portion 1328 formed on one side thereof to correspond to the coupling portion 1342. A coupling groove may be formed inside the boss portion 1328.

A coupling member such as a screw may be inserted through the coupling portion 1342 of the connector cover 134 so as to be coupled to the coupling groove of the boss portion 1328, so that the connector cover 134 and the inner body cover 132 can be coupled to each other. The coupling protrusion 1333 of the waterproof rib 1331 may be inserted into the coupling hole 1341 of the connector cover 134 so that the connector cover 134 and the waterproof rib 1331 can be coupled to each other.

A mounting rib 1343 may protrude downward from an inner surface of the connector cover 134 along edges of the connector cover 134. The mounting rib 1343 may form a sealer mounting groove together with an outer portion which protrudes along the edges of the connector cover 134.

A connector sealer (or connector seal or gasket) 1344 may be made of a rubber material. The connector sealer 1344 may be formed to have a rectangular cross-section and may extend along the edge of the connector cover 134. The connector sealer 1344 may be inserted into the sealer mounting groove.

In order to couple the connector cover 134 and the connector sealer 1344, a coupling groove 1345 may be formed in one side of the connector sealer 1344. A coupling protrusion may protrude from the inner surface of the connector cover 134 to be inserted into the coupling groove 1345 of the connector sealer 1344.

The connector sealer 1344 may be disposed between a top of the waterproof rib 1331 and the inner surface of the connector cover 134. A sealer protruding portion 1346 may extend downward from one side of the connector sealer 1344 to cover the cutout portion 1332 of the waterproof rib 1331. With the configuration, the connector sealer 1344 can keep airtightness between the inner body 130 and the connector cover 134 and prevent water from penetrating into the inner body 130 through the opening 1329.

Figure 7:
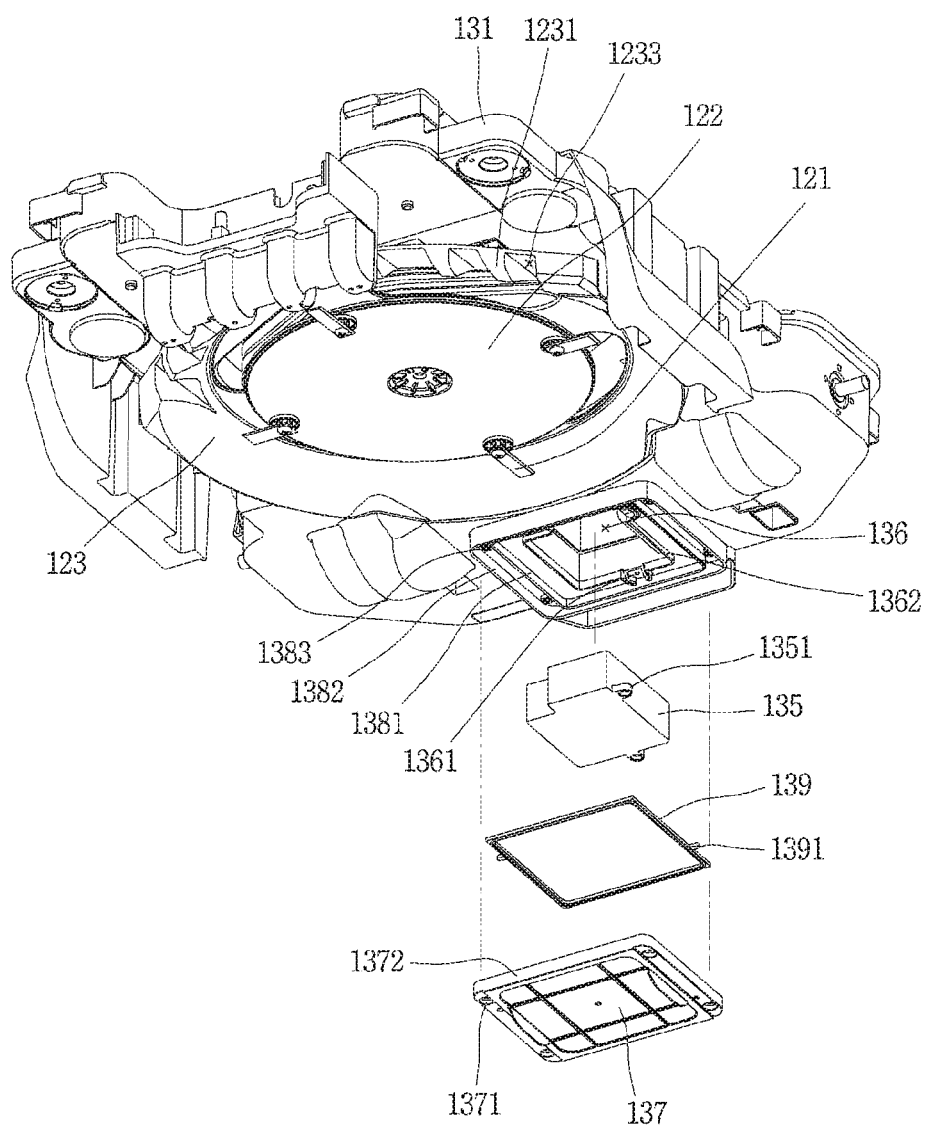
FIG. 7 is a conceptual view illustrating an exploded state before a battery is mounted on a bottom surface of the inner body main part in FIG. 3.
Figure 8:
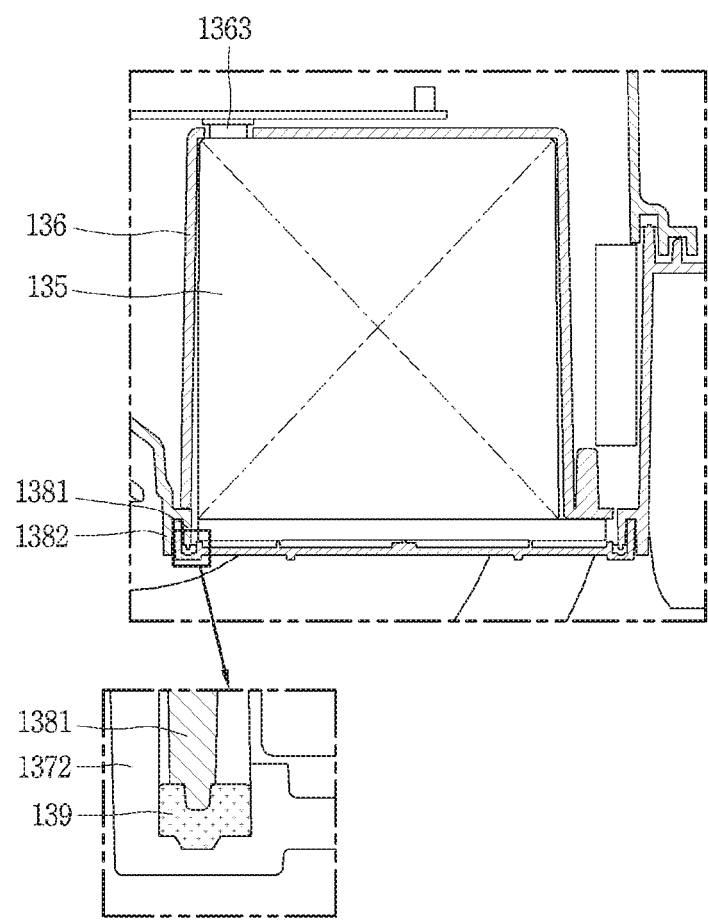
FIG. 8 is a conceptual view illustrating a state where the battery is mounted on the inner body by enlarging a part VIII in FIG. 2.

FIG. 7 is a conceptual view illustrating an exploded state before a battery 135 is mounted on a bottom surface of the inner body main part 131 in FIG. 3, and FIG. 8 is a conceptual view illustrating a state where the battery 135 is mounted on the inner body by enlarging a part VIII in FIG. 2. The battery 135 may be a rechargeable secondary battery, and may be configured to supply power to electric devices (or electric components) such as a motor and the like. The battery 135 may be mounted on the bottom surface of the inner body main part 131.

The inner body 130 is provided with a battery receiving portion (or battery receiving recess) 136 for mounting the battery 135 therein. The battery receiving portion 136 may be recessed upward from a bottom surface of the inner body main part 131 toward an inner space of the inner body 130. The battery receiving portion 136 may be configured to enclose the battery 135.

The battery receiving portion 136 may be formed in a rectangular box structure corresponding to the size and shape of the battery 135. The battery receiving portion 136 may be formed to be opened downward, so that the battery 135 can be attached from the bottom surface of the inner body main part 131 to be received in the battery receiving portion 136. A through hole may be formed through an upper end part of the battery receiving portion 136 and a battery power source terminal 1363 may be inserted through the through hole so as to supply power to electric parts disposed inside the inner body 130.

A plurality of first coupling portions (or first coupling tabs) 1351 may laterally protrude from lower edges of the battery 135. A plurality of second coupling portions (or second coupling tabs) 1361 may be formed on a bottom surface of the battery receiving portion 136 to correspond to the plurality of first coupling portions 1351.

A coupling hole may be formed in the first coupling portion 1351 and a coupling groove may be formed in the second coupling portion 1361. A coupling member such as a screw may be inserted through the first coupling portion 1351 to be coupled to the second coupling portion 1361, so that the battery 135 can be coupled to the inner body 130.

A protruding rib 1362 may protrude downward from a lower end of the battery receiving portion 136 along the edges of the battery 135, to surround a lower end portion of the battery 135. The second coupling portion 1361 may protrude into a curved shape from one side of the protruding rib 1362 so as to surround the first coupling portion 1351.

A battery cover 137 may be mounted on the bottom surface of the inner body main part 131 so as to enclose the battery receiving portion 136. The battery cover 137 may be formed in a rectangular shape. A sealing rib (or battery cover sealing rib) 1372 may protrude from an outermost portion of the battery cover 137 along edges. A plurality of coupling holes 1371 may be formed at four corners of the battery cover 137.

A double sealing rib may protrude downward from the bottom surface of the inner body main part 131. The double sealing rib may be disposed lower than a lower end of the battery 135.

The double sealing rib may include a first sealing rib 1381 and a second sealing rib 1382. The first sealing rib 1381 may be formed in a rectangular shape that is larger than an area of the bottom surface of the battery 135. The second sealing rib 1382 may be formed in a rectangular shape that is larger than the first sealing rib 1381 in area.

A rib receiving groove may be formed between the first sealing rib 1381 and the second sealing rib 1382. A plurality of boss portions (or bosses) 1383 may be formed in the rib receiving groove, and a coupling groove may be formed in each of the plurality of boss portions 1383. Coupling members such as screws or the like may be coupled to the boss portions 1383 of the rib receiving groove through the coupling holes 1371 of the battery cover 137, so that the battery cover 137 can be coupled to the inner body 130.

A lower end of the second sealing rib 1382 may extend downward to be longer than a lower end of the first sealing rib 1381. An inner surface of the battery cover 137 may be brought into contact with the lower end of the first sealing rib 1381 by a step between the first sealing rib 1381 and the second sealing rib 1382, and the sealing rib 1372 protruding upward along the edges of the bottom surface of the battery cover 137 may be inserted into the rib receiving groove.

The bottom surface of the battery cover 137 may be received at an inner side of the second sealing rib 1382. A battery sealer (or battery seal or gasket) 139 may be mounted on the inner surface of the battery cover 137. The battery sealer 139 may be made of a rubber material. The battery sealer 139 may be formed in a rectangular shape wider than the battery 135 in size.

The battery 135 can be received inside the battery sealer 139 when viewed upwardly from the bottom surface of the battery cover 137 toward the battery 135. A plurality of sealer coupling portions (or batter seal coupling tabs) 1391 may be formed on both sides of the battery sealer 139 in a longitudinal direction of the battery sealer 139 in a manner of protruding outward into a ring shape. A plurality of sealer coupling holes may be formed in the battery cover 137. Coupling members such as screws may be coupled to the plurality of sealer coupling portions 1391 and the plurality of seal coupling holes, respectively, so that the battery sealer 139 and the battery cover 137 can be coupled to each other.

The battery sealer 139 may be disposed in close contact with a lower end of the first sealing rib 1381. With this configuration, the battery sealer 139 can be disposed between the battery cover 137 and the first sealing rib 1381 of the inner body 130 so as to keep airtightness between the battery cover 137 and the inner body 130.

The sealing rib 1372 of the battery cover 137 and the first sealing rib 1381 and the second sealing rib 1382 of the inner body 130 may be arranged to overlap each other in a back and forth direction and a right and left direction, which may result in enhancing sealing performance and preventing penetration of water into the battery receiving portion 136. In addition, since the coupling grooves of the boss portions 1383 for coupling the battery cover 137 to the inner body 130 are disposed outside the battery sealer 139, penetration of water caused by a fine gap can be blocked.

Figure 9:
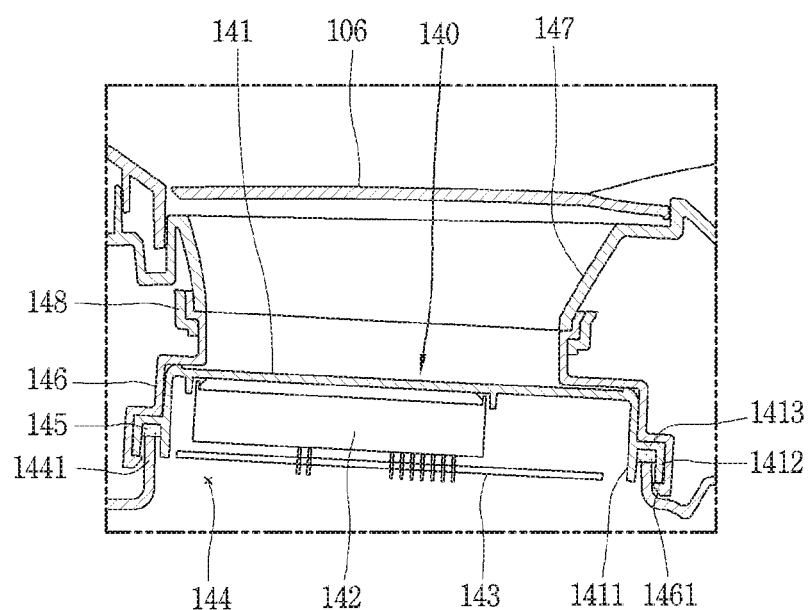
FIG. 9 is a conceptual view illustrating a state where a display is mounted on the inner body by enlarging a part IX in FIG. 2.

FIG. 9 is a conceptual view illustrating a state where a display is mounted on the inner body 130 by enlarging a part IX in FIG. 2. A user interface (UI) module 140 may be mounted on an upper portion of the rear of the inner body cover 132. The UI module 140 may be provided on a top thereof with a plurality of operation buttons manipulated by the user to control the operation of the robot. The plurality of operation buttons may be implemented in various ways such as a button type, a touch type, and the like.

The UI module 140 may include a UI cover 141, an LCD module 142, and a UI PCB 143. The LCD module 142 may be configured to provide the user with information for the operation of the robot. The UI PCB 143 may be mounted on a bottom of the LCD module. The UI module 140 may be disposed below the second top cover 106. Accordingly, when the second top cover 106 is opened, the user can manipulate the operation buttons of the UI module 140 or recognize information from the LCD module 142.

The UI module 140 may be configured to be assembled downward from an upper side of the inner body cover 132 in an inserting manner. A UI module receiving portion (or UI module receiving recess) 144 may be formed inside the inner body 130. The UI module receiving portion 144 may be formed to be open upward at the upper portion of the inner body cover 132.

A UI sealing rib 1441 may protrude upward from a top of the UI module receiving portion 144. The UI sealing rib 1441 may be formed in a rectangular box structure to accommodate or receive the LCD module 142. The UI cover 141 may have a double sealing rib structure along its edges.

The double sealing rib structure may include a first sealing rib 1411, a second sealing rib 1412, and a rib connecting portion 1413. The first sealing rib 1411 may extend downward from the edges of the UI cover 141. The second sealing rib 1412 may protrude downward from the edges of the UI cover 141 and be spaced apart from the first sealing rib 1411 in a front and rear direction and a right and left direction.

The rib connecting portion 1413 may horizontally extend from an upper end of the first sealing rib 1411 to an upper end of the second sealing rib 1412 to connect the first sealing rib 1411 and the second sealing rib 1412. A rib receiving groove may be formed between the first sealing rib 1411 and the second sealing rib 1412.

The UI sealing rib 1441 of the inner body cover 132 may be inserted into the rib receiving groove. The first sealing rib 1411 and the second sealing rib 1412 of the UI cover 141 and the UI sealing rib 1441 may be arranged to overlap each other in the back and forth direction and the right and left direction of the UI cover 141, thereby enhancing sealing performance of the UI cover 141.

A UI sealer (or UI seal or gasket) 145 may be inserted into the rib receiving groove. The UI sealer 145 may have a rectangular cross-sectional shape and may be formed in a rectangular shape along the edges of the UI cover 141. The UI sealer 145 may be fixedly coupled to the rib receiving groove in a shrink-fitting manner. When the UI cover 141 is mounted on the upper portion of the inner body cover 132, the UI sealer 145 may be disposed between the upper end of the UI sealing rib 1441 and the rib receiving groove of the UI cover 141, so as to keep airtightness between the inner body cover 132 and the UI cover 141 and prevent penetration of water or the like into the inner body 130 through the upper part of the UI module receiving portion 144.

The inner body cover 132 may be provided with a plurality of boss portions 1442 protruding upward from an upper surface thereof. The plurality of boss portions 1442 may be arranged with being spaced apart from one another in a front and rear direction and a right and left direction of the UI sealing rib 1441. The plurality of boss portions 1442 may be provided with coupling grooves therein, respectively.

A plurality of coupling portions (or coupling tabs) 1414 may protrude from a front surface and a rear surface of the UI cover 141 in the back and forth direction and the right and left direction. The plurality of coupling portions 1414 can be spaced apart from each other in the right and left direction of the UI cover 141. The plurality of boss portions 1414 may be provided with coupling grooves therein, respectively.

The plurality of boss portions 1442 may be arranged to face the coupling portions 1414 of the UI cover 141 in an up and down direction. Accordingly, coupling members such as screws or the like may be coupled to the coupling grooves of the boss portions 1442 through the coupling portions 1414 of the UI cover 141, so that the UI cover 141 can be coupled to the inner body cover 132. With this configuration, the coupling portions 1414 of the UI cover 141 can be disposed outside the UI sealer 145, so as to prevent penetration of water into the UI sealer through a fine gap. Also, the UI sealer 145 can be compressed between the UI cover 141 and the UI sealing rib 1441 by coupling force at the time of coupling the UI cover 141 and the inner body cover 132, thereby further enhancing sealing performance.

A keypad may be mounted on a top of the UI cover 141 to be pressed, so that the user can press the keypad for controlling the robot. An LCD opening may be formed through the upper part of the UI cover 141 so that a display of the LCD module 142 displaying information can be exposed upward.

Dust or the like generated between an inner side of the outer cover 100 and the inner body cover 132 may be laid or caught on the top of the UI cover 141, which may cause the keypad to be malfunctioned or information on the display to be invisible. In order to solve this problem, a UI dustproof cover (or dust cover) 146 may be disposed between the outer cover 100 and the UI cover 141. An upper end portion of the UI dustproof cover 146 may be coupled to the outer cover 100 and a lower end portion of the UI dustproof cover 146 may be coupled to the UI cover 141. The cover extension portion (or cover extension) 147 may protrude downward from a rear upper portion of the outer cover 100 toward the UI cover 141.

A coupling frame 148 for coupling the UI dustproof cover 146 to the outer cover 100 may be formed along edges of the upper end portion of the UI dustproof cover 146. The coupling frame 148 may be formed in a rectangular box structure. The coupling frame 148 may be formed to be larger than a lower end part of the cover extension portion 147 by a thickness of the upper end portion of the UI dustproof cover 146.

According to this configuration, the UI dustproof cover 146 can be fitted to cover an outer surface of the cover extension portion 147, and the coupling frame 148 can be fitted to cover an outer surface of the UI dustproof cover 146 and compress the outer surface of the UI dustproof cover 146 on the cover extension portion 147, so that the upper end portion of the UI dustproof cover 146 can be coupled to the cover extension portion 147 of the outer cover 100.

A lower portion of the UI dustproof cover 146 may be configured to surround edges of an upper surface of the UI cover 141 and a coupling hook 1461 may be formed on a lower end of the UI dustproof cover 146. The coupling hook 1461 may be locked on a lower end of the second sealing rib 1412 of the UI cover 141, so that the UI dustproof cover 146 and the UI cover 141 can be coupled to each other.

Figure 10:
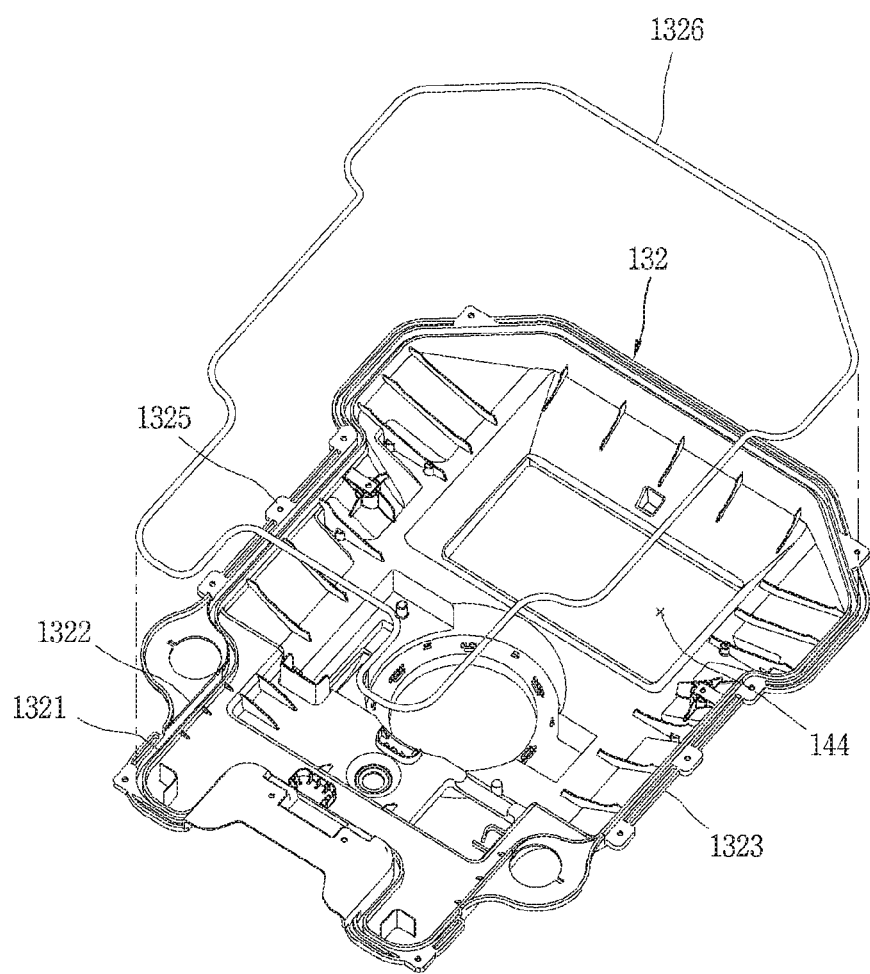
FIG. 10 is a conceptual view illustrating a state where an inner body sealer is disassembled from an inner surface of the inner body cover in FIG. 4.
Figure 11:
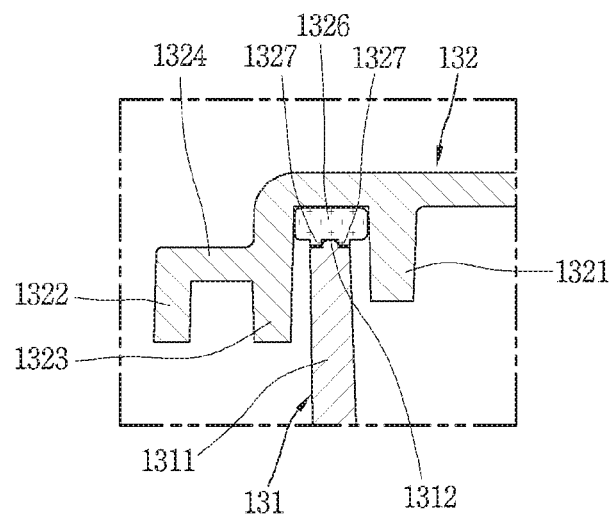
FIG. 11 is a conceptual view illustrating a triple sealing protrusion structure of the inner body cover by enlarging a part XI in FIG. 2.

FIG. 10 is a conceptual view illustrating a state where an inner body sealer is disassembled from an inner surface of the inner body cover 132 in FIG. 4, and FIG. 11 is a conceptual view illustrating a triple sealing protrusion structure of the inner body cover 132 by enlarging a part XI in FIG. 2.

A double or triple sealing protrusion structure may be formed on an outer portion of the inner body cover 132. The double sealing protrusion structure may include a first sealing protrusion 1321 and a second sealing protrusion 1322. The double sealing protrusion structure may extend along edges of the inner body cover 132. The double sealing protrusion structure may protrude downward from the outer portion of the inner body cover 132.

The first sealing protrusion 1321 may be disposed at an inner side of the outer portion of the inner body 130 in the back and forth direction or the right and left direction. The second sealing protrusion 1322 may be disposed at an outer side of the outer portion of the inner body 130 with being spaced apart from the first sealing protrusion 1321. A body receiving groove may be defined between the first sealing protrusion 1321 and the second sealing protrusion 1322.

A triple sealing protrusion structure may further include a third sealing protrusion 1323, and the first sealing protrusion 1321 and the second sealing protrusion 1322 may be configured the same as those of the double sealing protrusion structure. The third sealing protrusion 1323 may be spaced apart from the second sealing protrusion 1322 in the back and forth direction and the right and left direction of the inner body 130.

A protrusion connecting portion 1324 may extend horizontally from the second sealing protrusion 1322 to an upper end portion of the third sealing protrusion 1323 to connect the third sealing protrusion 1323 to the outer portion of the inner body cover 132. A body receiving groove may be further defined between the second sealing protrusion 1322 and the third sealing protrusion 1323.

The third sealing protrusion 1323 may be selectively applied to the outer portion of the inner body cover 132. The third sealing protrusion 1323 may be formed in plurality in a manner of being spaced apart from each other along the edge of an upper end portion of the inner body main part 131. For example, the third sealing protrusions 1323 may be arranged on both side surfaces of the inner body main part 131 in the right and left direction, so as to be coupled to protrusion ribs 1311 which protrude from both side surfaces of the inner body main part 131.

A body sealer (or body seal or gasket) 1326 may be inserted into the body receiving groove. The body sealer 1326 may extend along the edges of the inner body 130. The body sealer 1326 may be formed in a rectangular cross-sectional shape. The body sealer 1326 may be made of a rubber material. An upper surface of the body sealer 1326 may be closely adhered on an inner surface of the body receiving groove, and a plurality of adhesion protrusions 1327 may protrude downward from a bottom surface of the body sealer 1326 along the edges of the inner body 130.

The upper end portion of the inner body main part 131 may be received in the body receiving groove, and accordingly the first sealing protrusion 1321, the second sealing protrusion 1322 and the upper end portion of the inner body main part 131 can be arranged in an overlapping manner in the back and forth direction and the right and left direction.

A sealing protrusion 1312 may protrude upward from the upper end of the inner body main part 131. When the upper end portion of the inner body main part 131 is inserted into the body receiving groove, the sealing protrusion 1312 may be inserted between the adhesion protrusions 1327 of the body sealer 1326. According to this configuration, the body sealer 1326 can maintain airtightness between the inner body main part 131 and the inner body cover 132, and prevent water or the like from penetrating into the inner body 130.

A width of the body receiving groove may correspond to a thickness of the upper end portion of the inner body main part 131. Accordingly, the first and second sealing protrusions 1321 and 1322 of the inner body cover 132 and the upper end portion of the inner body main part 131 can be stably supported by each other without shaking in the back and forth direction and the right and left direction.

In this manner, the first and second sealing protrusions 1321 and 1322 of the inner body cover 132 and the inner body main part 131 can be disposed to overlap each other in the double or triple manner, thereby preventing penetration of external foreign substances into a gap between the inner body cover 132 and the inner body main part 131.

A plurality of coupling portions (or coupling tabs) 1325 may be disposed on the outer portion of the upper end of the inner body main part 131 and an outer portion of a lower end of the inner body cover 132 in a spacing manner along the edges of the inner body 130. The coupling portions 1325 of the inner body main part 131 and the coupling portions 1325 of the inner body cover 132 may be arranged to overlap each other in the up and down direction.

The coupling portions 1325 of the inner body main part 131 and the coupling portions 1325 of the inner body cover 132 may be provided with coupling holes, respectively. According to this structure, coupling members such as screw or the like can be inserted through the coupling portions of the inner body main part 131 and the coupling portions of the inner body cover 132, so that the inner body cover 132 and the inner body main part 131 can be coupled to each other.

The coupling portions of the inner body main part 131 and the coupling portions 1325 of the inner body cover 132 may be disposed at an outer side of the body sealer 1326. Accordingly, the coupling members inserted through the coupling portions of the inner body main part 131 and the coupling portions of the inner body cover 132 may press up and down the outer portions of the inner body cover 132 and the inner body main part 131 to be closely adhered on the body sealer 1326, which may result in enhancing sealing performance and preventing penetration of water into a fine gap.

Figure 12:
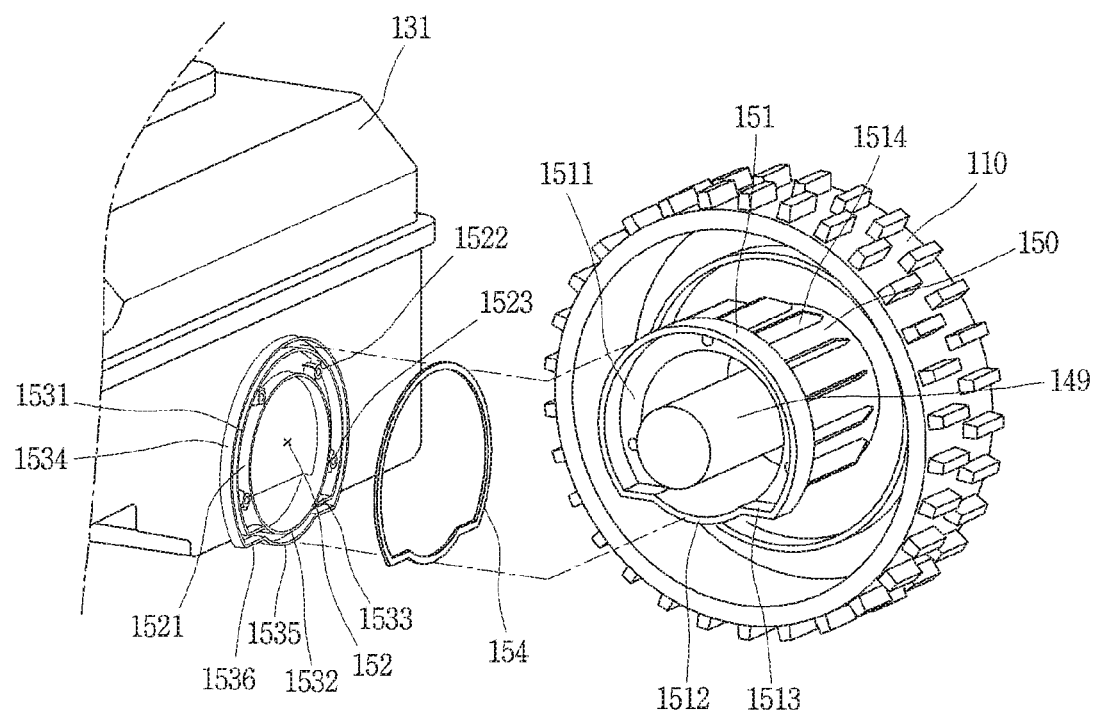
FIG. 12 is a conceptual view illustrating a state where a wheel and a wheel driving motor are disassembled from the inner body in FIG. 3.

FIG. 12 is a conceptual view illustrating a state where the wheel 110 and the wheel driving motor 149 are disassembled from the inner body 130 in FIG. 3. The wheel driving motors 149 may be independently mounted on the rear of both right and left side surfaces of the inner body 130. A wheel driving motor holder (or wheel driving motor housing) 150 may be configured to mount the wheel driving motor 149 to the inner body 130.

To this end, the wheel driving motor holder 150 may be formed in a cylindrical shape. The wheel driving motor holder 150 may have a structure with one side closed and another side opened in a lengthwise direction. A through hole may be formed in a central portion of the closed one side of the wheel driving motor holder 150 in the lengthwise direction, so that a motor shaft of the wheel driving motor 149 can pass through the through hole. The motor shaft of the wheel driving motor 149 may be coupled to a shaft coupling portion formed on a completely central portion of the wheel 110 so as to drive the wheel 110.

A plurality of coupling holes may be formed in one end portion of the wheel driving motor holder 150 in a spacing manner along a circumferential direction. Coupling members such as screws may be inserted through the one end portion of the wheel driving motor holder 150 via the plurality of coupling holes so as to be coupled to coupling grooves formed in one end portion of the wheel driving motor 149 in the lengthwise direction, so that the wheel driving motor 149 and the wheel driving motor holder 150 can be coupled to each other.

The sealing partition wall 151 may extend from another end portion of the wheel driving motor holder 150 in a lengthwise direction of the wheel driving motor holder 150 to protrude in a cylindrical shape or a ring shape. The sealing partition wall 151 may be spaced apart from the wheel driving motor holder 150.

A partition wall connection rib 1511 may extend radially outward from the another end of the wheel driving motor holder 150 to connect the wheel driving motor holder 150 to the sealing partition wall 151. The partition wall connection rib 511 may be provided with a plurality of coupling holes formed in the circumferential direction.

A lower partition wall 1512 may be disposed below the sealing partition wall 151 in a spacing manner. The lower partition wall 1512 may protrude axially from a lower portion of the another end portion of the wheel driving motor holder 150 and extend in an arcuate shape.

The lower partition wall 1512 may be formed to have a curved surface with the same curvature as that of the wheel driving motor holder 150. Lower connection partition walls 1513 may extend horizontally from both sides of the lower portion of the sealing partition wall 151 to the lower partition wall 1512 to connect the sealing partition wall 151 and the lower partition wall 1512.

The partition wall connection rib 1511 and an outer circumferential surface of the wheel driving motor holder 150 may be arranged to intersect with each other in a perpendicular direction, and a plurality of holder ribs 1514 may extend from the outer circumferential surface of the wheel driving motor holder 150 to an outer end of the partition wall connection rib 1511 in a radial direction, so that the wheel driving motor holder 150 and the partition wall connection rib 1511 can be connected to each other. Accordingly, the plurality of holder ribs 1514 can reinforce support rigidity of the sealing partition wall 151 supported by the wheel driving motor holder 150.

A plurality of inner ribs may protrude axially from an inner surface of the partition wall connection rib 1511 and radially extend. The plurality of inner ribs may be disposed with being spaced apart in the circumferential direction of the partition wall connection rib 1511. Accordingly, the plurality of inner ribs can reinforce the support rigidity of the sealing partition wall 151 supported by the wheel driving motor holder 150.

Wheel driving motor receiving portions (or wheel driving motor receiving recesses) 152 for receiving the wheel driving motor 149 may be formed through both right and left sides of the inner body main part 131 so as to be opened laterally. A water blocking rib 1521 may protrude from the water driving motor receiving portion 152 laterally to the right and left sides of the inner body main part 131. The water blocking rib 1521 may be formed in a cylindrical shape.

With this configuration, the water blocking rib 1521 may protrude toward an inner receiving space of the wheel driving motor holder 150 and an end portion of the water blocking rib 1521 may extend into the inner space of the wheel driving motor holder 150, thereby preventing penetration of water into the wheel driving motor 149.

A plurality of boss portions (or bosses) 1522 may be formed on both right and left side surfaces of the inner body main part 131. The plurality of boss portions 1522 may be formed in a protruding manner at an outside of the water blocking ribs 1521. The plurality of boss portions may be disposed with being spaced apart in a circumferential direction. The plurality of boss portions 1522 may protrude laterally from both the right and left side surfaces of the inner body 130.

The plurality of boss portions 1522 may be provided with coupling grooves therein, respectively. Each of the plurality of boss portions 1522 may be provided with a plurality of extension ribs 1523 extending radially outward from an outer circumferential surface of the boss portion 1522. According to such a configuration, the plurality of extension ribs 1523 can reinforce support rigidity of the boss portion 1522 supported by the inner body 130.

A plurality of sealing ribs 1531 and 1534 may protrude laterally from the right and left side surfaces of the inner body main part 131 at an outside of the plurality of extension ribs 1523. The plurality of sealing ribs 1531 and 1534 may include first sealing ribs 1531 and second sealing ribs 1534.

The first sealing ribs 1531 may protrude to the right and left sides of the inner body 130 in a manner of circumscribing the plurality of extension ribs 1523 and extend in a circumferential direction. The second sealing ribs 1534 may be formed outside the first sealing ribs 1531 in a radially spacing manner, and may be formed to have a larger diameter than the first sealing rib 1531.

A first lower rib 1532 may be formed at a lower portion of the first sealing rib 1531 to correspond to the lower partition wall 1512 of the wheel driving motor holder 150, for example, may protrude axially to surround an inner circumferential surface of the lower partition wall 1512 and extend in an arcuate shape.

First lower connection ribs 1533 may horizontally extend from lower end portions of the first sealing rib 1531 to both end portions of the first lower rib 1532 so as to connect the first sealing rib 1531 and the first lower rib 1532. The first lower rib 1532 may be formed to share a portion (lower portion) of the water blocking rib 1521, or to surround the lower portion of the water blocking rib 1521. In this embodiment, the first lower rib 1532 is formed to share the lower portion of the water blocking rib 1521.

A second lower rib 1535 may be formed at a lower portion of the first sealing rib 1534 to correspond to the lower partition wall 1512 of the wheel driving motor holder 150, for example, may protrude axially to surround an outer circumferential surface of the lower partition wall 1512 and extend in an arcuate shape. Second lower connection ribs 1536 may horizontally extend from lower end portions of the second sealing rib 1534 to both end portions of the second lower rib 1535 so as to connect the second sealing rib 1534 and the second lower rib 1535. The first sealing rib 1531 and the second sealing rib 1534 may be configured to be spaced apart from each other by a thickness of the sealing partition wall 151, so as to accommodate the sealing partition wall 151 of the wheel driving motor holder 150 therebetween.

A partition wall receiving groove may be formed between the first sealing rib 1531 and the second sealing rib 1534 to accommodate the sealing partition wall 151. A wheel driving motor sealer (or wheel driving motor seal or gasket) 154 may be inserted into the partition wall receiving groove. The wheel driving motor sealer 154 may have a rectangular cross-sectional shape. The wheel driving motor sealer 154 may be formed in a shape corresponding to the first and second sealing ribs 1531 and 1534 and the first and second lower ribs 1532 and 1535.

With this configuration, the sealing partition wall 151 of the wheel driving motor holder 150 can be inserted between the first sealing rib 1531 and the second sealing rib 1534, so as to overlap the first and second sealing ribs 1531 and 1534 in the radial direction. This may result in blocking penetration of water or the like into the wheel driving motor receiving portion 152, together with the water blocking rib 1521, in a double or triple manner.

Also, the wheel driving motor sealer 154 can be disposed between the sealing partial wall 151 and the partition wall receiving groove, thereby maintaining airtightness between the inner body main part 131 and the wheel driving motor holder 150 and preventing penetration of water or the like into the wheel driving motor receiving portion 152.

In addition, the lower partition wall 1512 may be formed in the arcuate shape at the lower portion of the sealing partition wall 151 and the lower connection partition walls 1513 may extend horizontally from the lower end portions of the sealing partition wall 151 to be connected to the lower partition wall 1512. Accordingly, even though an operator does not check a coupling position between the coupling holes of the wheel driving motor holder 150 and the boss portions 1522 of the inner body 130, assembling positions of the wheel driving motor holder 150 and the inner body 130 can be accurately aligned by inserting the lower partition wall 1512 into a gap between the first lower rib 1532 and the second lower rib 1535 or inserting the lower connection partition walls 1513 into a gap between the first lower connection ribs 1533 and the second lower connection ribs 1536, thereby facilitating the assembling of the wheel driving motor holder 150 and the inner body 130.

Also, the lower portion of the wheel driving motor receiving portion 152 may protrude downward from the bottom surface of the inner body main part 131 to be in the arcuate shape, so as to surround the wheel driving motor 149, which may result in minimizing the size of the inner body 130 and reducing fabricating cost.

Figure 13:
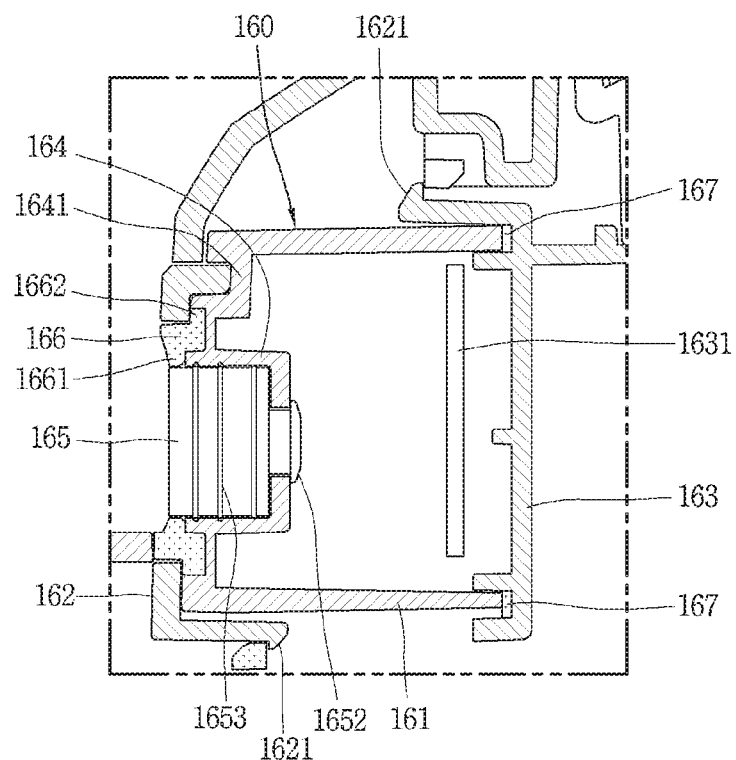
FIG. 13 is a sectional view illustrating a sealing structure of an ultrasonic sensor module by enlarging a part XIII in FIG. 2.
Figure 14:
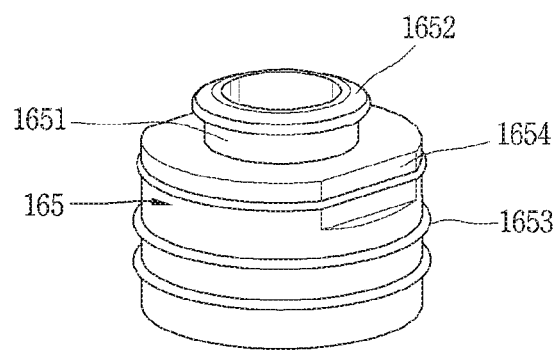
FIG. 14 is a conceptual view illustrating an anti-vibration cover of the ultrasonic sensor in FIG. 10.

FIG. 13 is a sectional view illustrating a sealing structure of an ultrasonic sensor module 102 by enlarging a part XIII in FIG. 2, and FIG. 14 is a conceptual view illustrating an anti-vibration cover 165 of the ultrasonic sensor in FIG. 10. A plurality of ultrasonic sensor modules 102 may be mounted on a front upper portion of the inner body cover 132.

The plurality of ultrasonic sensor modules 102 may be manufactured as a single module. To this end, an ultrasonic sensor frame 160 may include a plurality of ultrasonic sensor mounting portions 164 formed therein and a plurality of the ultrasonic sensor modules 102 may be mounted in the ultrasonic sensor mounting portions 164, respectively. The ultrasonic sensor frame 160 may extend in the right and left direction of the inner body 130.

The ultrasonic sensor frame 160 may include a frame body (or frame mount) 161, a front cover 162, and a rear cover 163. The frame body 161 may have a receiving space therein and may extend in the right and left direction of the inner body 130. Front and rear end portions of the frame body 161 may be opened.

The front cover 162 may be mounted to cover a front portion of the frame body 161. A plurality of stopping hooks 1621 may extend rearward from upper and lower portions of the front cover 162, so as to be locked in the inner body 130. The rear cover 163 may be mounted to cover a rear portion of the frame body 161. An ultrasonic sensor PCB 1631 for controlling an operation of the ultrasonic sensor may be mounted on the rear cover 163. A plurality of stopping hooks 1621 may extend forward from upper and lower portions of the rear cover 163, so as to be locked hooked in the inner body 130.

The plurality of ultrasonic sensor mounting portions 164 may be disposed in the frame body 161 with being spaced apart from one another in the right and left direction. The plurality of ultrasonic sensor mounting portions 164 may be formed in a cylindrical shape so as to surround the ultrasonic sensors. Ultrasonic sensor supporting portions 1641 may extend in an up and down direction inside the frame body 161 toward the plurality of ultrasonic sensor mounting portions 164, so as to support the plurality of ultrasonic sensor mounting portions 164.

Each of the plurality of ultrasonic sensor modules 102 may be provided with a anti-vibration cover 165 to surround an outer circumferential surface of the ultrasonic sensor. The anti-vibration cover 165 may be formed in a cylindrical shape. The anti-vibration cover 165 may have a front surface which is opened in an emitting direction of the ultrasonic sensor. The anti-vibration cover 165 may be made of a rubber material and prevent vibration generated by the ultrasonic sensor from being transmitted to the frame body 161 or the like through the ultrasonic sensor mounting portion 164.

A rear surface of the anti-vibration cover 165 may be opened rearward so that a wire for power connection can be connected. A coupling hook 1651 may extend in a lengthwise direction from a rear end portion of the anti-vibration cover 165 to have a small diameter in a circumferential direction, and a stopping portion 1652 may protrude radially from an end portion of the coupling hook 1651 in a wedge shape, thereby preventing separation of the anti-vibration cover 165 to the front of the ultrasonic sensor mounting portion 164. The anti-vibration cover 165 may be coupled to an inside of the ultrasonic sensor mounting portion 164 in a shrink-fitting manner.

A plurality of fitting protrusions 1653 may extend from an outer circumferential surface of the anti-vibration cover 165 along a circumferential direction. The plurality of fitting protrusions 1653 may be spaced apart in a lengthwise direction of the anti-vibration cover 165.

Anti-rotation portions 1654 may be formed in a shape of a plane on an outer circumferential surface of the anti-vibration cover 165. The anti-rotation portion 1654 may be recessed radially into the outer circumferential surface of the rear portion of the anti-vibration cover. Accordingly, the anti-rotation portion 1654 can prevent the anti-vibration cover 165 from rotating in the circumferential direction with respect to the ultrasonic sensor mounting portion 164.

A plurality of fitting grooves may be formed on an inner circumferential surface of the ultrasonic sensor mounting portion 164. With such a configuration, the plurality of fitting protrusions 1653 can be inserted into the plurality of fitting grooves, respectively, so that the anti-vibration cover 165 can be prevented from slipping forward out of the ultrasonic sensor mounting portion 164.

The ultrasonic sensor mounting portion 164 may be opened forward and a penetrating portion may be formed through a center of a rear end part of the ultrasonic sensor mounting portion 164, so that the coupling hook 1651 of the anti-vibration cover 165 can be inserted through the penetrating portion to be coupled to the ultrasonic sensor mounting portion 164 in a hooking manner.

An ultrasonic sensor sealer may be configured to shield water or the like from penetrating into the ultrasonic sensor frame 160. The ultrasonic sensor sealer may be made of a rubber material and may include a first ultrasonic sensor sealer (or first ultrasonic sensor seal or gasket) 166 and a second ultrasonic sensor sealer (or second ultrasonic sensor seal or gasket) 167.

The first ultrasonic sensor sealer 166 may be disposed between the front cover 162 and the frame body 161 to maintain airtightness between the front cover 162 and the frame body 161. For this purpose, the first ultrasonic sensor sealer 166 may be formed in a ring shape. A sealer insertion groove may be formed in the ultrasonic sensor supporting portion 1641 along the circumference of the ultrasonic sensor mounting portion 164.

The first ultrasonic sensor sealer 166 may include a front protrusion 1661 and a rear protrusion 1662. The front protrusion 1661 may protrude radially inward from a front end portion of the first ultrasonic sensor sealer 166 and may be closely adhered on an outer circumferential surface of a front end portion of the anti-vibration cover 165, so as to be locked in the ultrasonic sensor mounting portion 164.

The rear protrusion 1662 may protrude radially outward from a rear end portion of the first ultrasonic sensor sealer 166 so that a front surface of the rear protrusion 1662 is closely adhered on the front cover 162 and rear and outer surfaces of the rear protrusion 1662 are closely adhered on the sealer insertion groove. The rear protrusion 1662 may be locked in the front cover 162.

With the configuration, the first ultrasonic sensor sealer 166 can maintain air tightness between the front cover 162 and the frame body 161 and prevent penetration of water or the like into the ultrasonic sensor frame 160 as the front protrusion 1661 is closely adhered on the front cover 162, the ultrasonic sensor mounting portion 164 of the frame body 161 and the anti-vibration cover 165, and the rear protrusion 1662 is closely adhered on the front cover 162 and the sealer insertion groove of the frame body 161. Also, the first ultrasonic sensor sealer 166 can be prevented from being separated out of the sealer insertion groove as the front protrusion 1661 is locked in the ultrasonic sensor mounting portion 164 and the rear protrusion 1662 is locked in the front cover 162.

The second ultrasonic sensor sealer 167 may be mounted on an inner surface of an outer portion of the rear cover 163 to maintain airtightness between the frame body 161 and the rear cover 163. For example, the second ultrasonic sensor sealer 167 may extend along a circumference of the outer portion of the rear cover 163. The second ultrasonic sensor sealer 167 may have a circular or rectangular cross-sectional shape. In this embodiment, the second ultrasonic sensor sealer 167 has a cross-section in a circular shape.

A first sealing rib and a second sealing rib may be formed at an outer portion of the inner space of the rear cover 163 in a penetrating manner. The first sealing rib may be disposed inside the outer portion of the inner surface of the rear cover 163 and the second sealing rib may be disposed outside the outer portion of the rear cover 163.

A sealer receiving groove may be defined between the first sealing rib and the second sealing rib. With this configuration, a rear end portion of the frame body 161 can be inserted into the sealer receiving groove, the first sealing rib and the second sealing rib of the rear cover 163 and the rear end portion of the frame body 161 can be arranged to overlap each other in the up and down direction and the right and left direction of the frame body 161. Accordingly, the second ultrasonic sensor sealer 167 can maintain airtightness between the frame body 161 and the rear cover 163 and prevent penetration of water or the like into the frame body 161.

Also, the stopping hooks 1621 of the front cover 162 may be disposed outside the first ultrasonic sensor sealer 166 and the stopping hooks 1621 of the rear cover 163 may be disposed outside the second ultrasonic sensor sealer 167, thereby preventing penetration of water into the ultrasonic sensor frame 160 due to a fine gap.

Figure 15:
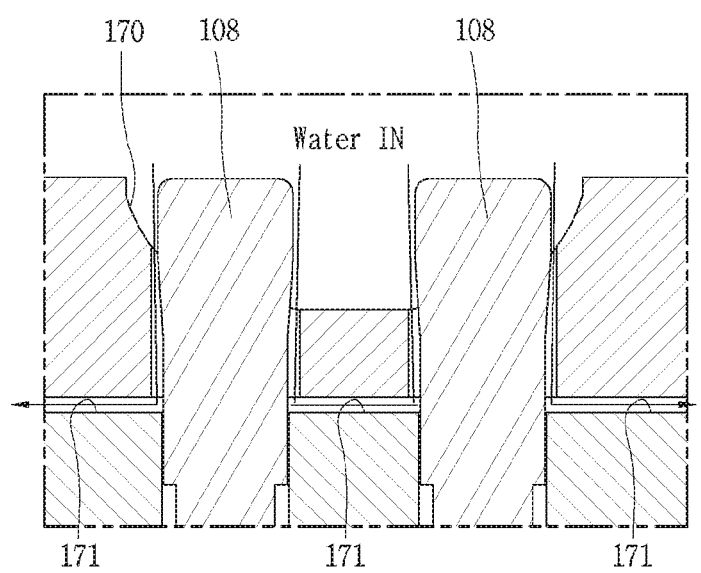
FIG. 15 is a sectional view illustrating a drainage structure of a rain sensor by enlarging a part XV in FIG. 1.

FIG. 15 is a sectional view illustrating a drainage structure of the rain sensor 108 by enlarging a part XV in FIG. 1. A recess 170 may be formed in one side of an upper portion of the outer cover 100 in a manner of being recessed downward to surround the plurality of rain sensors 108. The recess 170 may be formed in an elliptical shape. The plurality of rain sensors 108 may be spaced apart in a lengthwise direction of the recess 170.

To prevent raindrops from being collected in the recess 170 when it is raining, a drain hole 171 may be formed downward through the outer cover 100 in the recess 170. One end portion of the drain hole 171 may communicate with the recess 170, and another end portion of the drain hole 171 may communicate with an inner space of the outer cover 100.

The inner space of the outer cover 100 is a space between an outer surface of the inner body 130 and an upper inner surface of the outer cover 100. With this configuration, raindrops can be drained to the ground through the outer cover 100 along the drain hole 171, thereby preventing malfunction of the rain sensor 108 due to raindrops collected in the recess 170.

Aspects of the present disclosure provide a lawn mower robot, capable of enhancing waterproof performance by preventing water from penetrating into electric parts such as an ultrasonic sensor module, a battery, a wheel driving motor, a UI module, and the like, which are mounted inside an inner body. In order to achieve the above aspect and other aspects of the present disclosure, there is provided a lawn mower robot, including an outer cover, an inner body accommodated in the outer cover and having a plurality of wheels for traveling provided on both side surfaces thereof, a plurality of blades rotatably mounted on a bottom surface of the inner body to cut grass, electric devices or components mounted inside the inner body and including a battery, wheel driving motors, a blade driving motor, a plurality of ultrasonic sensor modules, rain sensors, a user interface (UI) module, and a universal serial bus (USB) port, and a waterproof unit, such as various combinations of seals and/or ribs, to prevent penetration of water into the inner body or the electric devices.

According to an embodiment of the present disclosure, the inner body may include a battery receiving portion opened downward from the bottom surface of the inner body, to receive and enclose the battery inside the inner body, and a battery cover mounted to cover a lower part of the battery accommodating portion. The waterproof unit may include a first sealing rib protruding downward from the bottom surface of the inner body into a rectangular box shape, a second sealing rib formed in a rectangular box shape and disposed outside the first sealing rib to be horizontally or longitudinally spaced apart from the first sealing rib, a sealing rib protruding upward along edges of the battery cover and inserted between the first sealing rib and the second sealing rib, and a battery sealer disposed at an inner side of the battery cover to be contactable with a lower end of the first sealing rib, so as to maintain airtightness between the battery receiving portion and the battery cover.

According to an embodiment of the present disclosure, between the first sealing rib and the second sealing rib may be provided a plurality of boss portions protruding downward, and the sealing rib may be provided with a plurality of coupling holes formed through edges thereof, so that the sealing rib and the plurality of boss portions are coupled in an up and down direction.

According to an embodiment of the present disclosure, the inner body may include wheel driving motor receiving portions formed laterally through both right and left side surfaces of the inner body, respectively, and wheel driving motor holders each accommodating the wheel driving motor therein for support, and having one side coupled to an inner surface of a wheel and another side coupled to the inner body so that the wheel driving motor can be received inside the inner body through the wheel driving motor receiving portion. The waterproof unit may include a first sealing rib extending laterally from each of both right and left side surfaces of the inner body along a circumferential direction, a second sealing rib protruding laterally from each of both the right and left side surfaces of the inner body along the circumferential direction in a manner of being spaced apart from the first sealing rib radially outside the first sealing rib, a sealing partition wall protruding axially from another side of the wheel driving motor holder along a circumferential direction, so as to be inserted between the first sealing rib and the second sealing rib, and a wheel driving motor sealer mounted between the first sealing rib and the second sealing rib in a contactable manner with the sealing partition wall, so as to maintain airtightness between the wheel driving motor receiving portion and the wheel driving motor holder.

According to an embodiment of the present disclosure, the waterproof unit may further include a water blocking rib disposed inside the first sealing rib and protruding axially from the wheel driving motor receiving portion along the circumferential direction.

According to an embodiment of the present disclosure, the inner body may include an elevating frame having a rotating plate rotatably mounted on a bottom surface thereof for rotating the plurality of blades, and mounted in the inner body to be movable up and down. The blade driving motor may be mounted inside the elevating frame. The waterproof unit may include a wrinkle portion adjustable in length in an up and down direction to correspond to the upward and downward movement of the elevating frame, and a blade sealing portion having one side coupled to the inner body and another side coupled to a bottom surface of the elevating frame.

According to an embodiment of the present disclosure, the lawn mower robot may further include an ultrasonic sensor frame mounted on an upper portion of the outer cover and having the plurality of ultrasonic sensor modules mounted therein. The ultrasonic sensor frame may include a frame body receiving the plurality of ultrasonic sensors therein for support, a rear cover having an ultrasonic sensor printed circuit board (PCB) mounted therein for controlling the plurality of ultrasonic sensors, and coupled to cover the rear of the frame body, and a front cover coupled to cover the front of the frame body. The waterproof unit may include a first ultrasonic sensor sealer to maintain airtightness between the front cover and the frame body, and a second ultrasonic sensor sealer to maintain airtightness between the rear cover and the frame body.

According to an embodiment of the present disclosure, the ultrasonic sensor frame may include an anti-vibration cover formed in a cylindrical shape to cover the plurality of ultrasonic sensor modules, provided with a coupling hook at a rear end portion thereof to be locked in the frame body, and made of a rubber material to absorb vibration generated in the plurality of ultrasonic sensor modules.

According to an embodiment of the present disclosure, the lawn mower robot may further include a recess formed in one side of an upper portion of the outer cover to receive the rain sensor. The waterproof unit may further include a drain hole having one end portion communicating with the recess and another end portion communicating with an inner space of the outer cover to drain raindrops introduced into the recess during rain out of a lower portion of the outer cover.

According to an embodiment of the present disclosure, the inner body may further include a UI module receiving portion formed in a rear upper portion of the inner body to be opened upward so as to receive the UI module therein. The UI module may include a liquid crystal display (LCD) module to display information to a user, a UI printed circuit board (PCB) to control the LCD module, and a UI cover mounted to cover an upper part of the UI module receiving portion. The waterproof unit may include a first sealing rib protruding downward from edges of the UI cover, a second sealing rib protruding downward from the edges of the UI cover to be spaced apart from the first sealing rib at an outside of the first sealing rib, a UI sealer mounted between the first sealing rib and the second sealing rib, and a UI sealing rib protruding upward in a rectangular box shape from an upper part of the UI module receiving portion, and disposed between the first sealing rib and the second sealing rib to be contactable with the UI sealer.

According to an embodiment of the present disclosure, the outer cover may be provided with a cover extension portion protruding downward from a rear upper portion thereof, and a dustproof cover may have an upper end portion coupled to the cover extension portion and a lower end portion coupled to the UI cover to prevent dust in an inner space between the outer cover and the inner body from penetrating into the UI cover.

According to an embodiment of the present disclosure, the USB port may be configured to enable software updating of a central processing unit (CPU) mounted in the inner body. The inner body may include an opening upwardly opened at the front of an upper portion thereof to communicate with the USB port, and a connector cover mounted to cover the opening. The waterproof unit may further include a mounting rib protruding downward along edges of the connector cover, a sealer mounting groove formed between an outer portion of the connector cover and the mounting rib, a connector sealer mounted along the sealer mounting groove, and a waterproof rib protruding upward in a rectangular box shape along a circumference of the opening to be contactable with the connector sealer.

According to an embodiment of the present disclosure, the inner body may include an inner body main part receiving the electric devices therein, and an inner body cover mounted to cover an upper portion of the inner body main part. The waterproof unit may include a first sealing protrusion protruding downward from an outer portion of the inner body cover, a second sealing protrusion spaced apart from the first sealing protrusion at an outside of the first sealing member in an overlapping manner in a back and forth direction or a right and left direction, and a body sealer mounted between the first sealing protrusion and the second sealing protrusion along edges of the inner body cover to maintain airtightness between the inner body main part and the inner body cover. An upper end portion of the inner body main part may be located between the first sealing protrusion and the second sealing protrusion and overlap the first sealing protrusion and the second sealing protrusion in a back and forth direction or a right and left direction of the inner body.

According to an embodiment of the present disclosure, the inner body cover may be provided with a plurality of coupling portions formed along edges thereof in a spacing manner, and the plurality of coupling portions may be disposed outside the body sealer.

According to one embodiment of the present disclosure, the lawn mower robot may further include a first top cover rotatably coupled to an upper portion of the outer cover by a hinge, and a second top cover rotatably coupled to a rear portion of the outer cover by a hinge. The first top cover may be formed to be inclined downward from a completely central portion toward right and left end portions in a right and left direction, and formed to be inclined downward from a rear end portion to a front side in a back and forth direction. The second top cover may be formed to be inclined downward from a completely central portion toward right and left end portions in the right and left direction, and formed to be inclined downward from a front end portion to a rear side in the back and forth direction.

These and other aspects of a lawn mower robot according to the present disclosure will be described as follows. First, a battery sealer may be disposed between a battery cover and a first sealing rib of an inner body, so that airtightness can be maintained between the battery cover and the inner body.

Further, a first sealing rib, a sealing protrusion, and a second sealing rib may be arranged to overlap one another in a back and forth direction or a right and left direction, thereby improving sealing performance and preventing water from penetrating into a battery receiving portion. In addition, since coupling grooves of boss portions for coupling the battery cover to the inner body are disposed outside a battery sealer, penetration of water caused by a fine gap can be blocked.

Secondly, a sealing partition wall of a wheel driving motor holder may be inserted between a first sealing rib and a second sealing rib, in a manner of overlapping the first and second sealing ribs in a radial direction, so that penetration of water or the like into a wheel driving motor receiving portion can be blocked together with a water blocking rib in a double or triple manner.

Also, a wheel driving motor sealer can be disposed between the sealing partial wall and a partition wall receiving groove, thereby maintaining airtightness between an inner body main part and the wheel driving motor holder and preventing penetration of water or the like into the wheel driving motor receiving portion.

In addition, a lower partition wall may be formed in an arcuate shape at a lower portion of the sealing partition wall and lower connection partition walls may extend horizontally from lower end portions of the sealing partition wall to be connected to the lower partition wall. Accordingly, even though an operator does not check a coupling position between coupling holes of the wheel driving motor holder and boss portions of the inner body, assembling positions of the wheel driving motor holder and the inner body can be accurately aligned by inserting the lower partition wall into a gap between a first lower rib and a second lower rib or inserting the lower connection partition walls into a gap between first lower connection ribs and second lower connection ribs, thereby facilitating the assembling of the wheel driving motor holder and the inner body.

Also, a lower portion of a wheel driving motor receiving portion may protrude downward from a bottom surface of the inner body main part to be curved in an arcuate shape, so as to surround the wheel driving motor, which may result in minimizing a size of the inner body and reducing fabricating cost. In addition, a water blocking rib may protrude toward an inner receiving space of the wheel driving motor holder, thereby preventing water from penetrating into the wheel driving motor.

Third, a blade sealing portion may be disposed between a lower portion of the inner body and a bottom surface of an elevating frame. An upper end of the blade sealing portion can be coupled to the lower portion of the inner body and a lower end of the blade sealing portion can be coupled to the bottom surface of the elevating frame together with a blade protection cover.

A bellows-shaped wrinkle portion may extend from a side surface of the blade sealing portion to be adjustable in length in an up and down direction.

According to this configuration, the wrinkle portion can be adjusted in length in the up and down direction by being folded or unfolded in a lengthwise direction. Accordingly, water tightness can be maintained between the lower portion of the inner body and the blade protection cover even though the blade protection cover, a rotating plate, and a plurality of blades move up and down together with the elevating frame, which may result in preventing damage to the blade driving motor due to penetration of water into the inner body, for example, the elevating frame from the lower portion of the inner body.

Fourthly, a first ultrasonic sensor sealer can maintain air tightness between a front cover and a frame body and prevent penetration of water or the like into an ultrasonic sensor frame as a front protrusion is closely adhered on the front cover, an ultrasonic sensor mounting portion of the frame body, and a dustproof cover, and a rear protrusion is closely adhered on the front cover and a sealer insertion groove of the frame body.

Further, the first ultrasonic sensor sealer can be prevented from being separated out of the sealer insertion groove as the front protrusion is locked in the ultrasonic sensor mounting portion and the rear protrusion is locked in the front cover. A second ultrasonic sensor sealer may be mounted on an inner surface of an outer portion of the rear cover to maintain airtightness between the frame body and the rear cover.

Fifth, a drain hole may be formed in a recess in a manner of penetrating downward through an outer cover. One end portion of the drain hole may communicate with the recess, and another end portion of the drain hole may communicate with an inner space of the outer cover. With this configuration, raindrops can be drained to the ground through the outer cover along the drain hole, thereby preventing malfunction due to raindrops collected in the recess.

Sixth, when a UI cover is mounted on an upper portion of an inner body cover, a UI sealer may be disposed between an upper end of a UI sealing rib and a rib receiving groove of the UI cover, so as to keep airtightness between the inner body cover and the UI cover and prevent penetration of water or the like into the inner body through an upper part of an UI module receiving portion.

In addition, a UI dustproof cover may be disposed between the outer cover and the UI cover. An upper end of the UI dustproof cover can be coupled to the outer cover, and a lower end of the UI dustproof cover can be coupled to the UI cover. This configures may solve a problem that dust or the like generated between an inner side of the outer cover and the inner body cover is laid or caught on an upper portion of the UI cover, which may cause a keypad to be malfunctioned or information on a display to be invisible.

Seventh, a connector sealer may be disposed between a connector cover covering a USB port and the inner body, so that airtightness can be maintained between the connector cover and the inner body, and water can be prevented from penetrating into the USB port through an opening.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lawn mower robot, comprising:
   an outer cover;
   an inner frame provided in the outer cover, a plurality of wheels being coupled to a side surface of the inner frame;
   a plurality of blades rotatably mounted on a lower surface of the inner frame;

electric components mounted on the inner frame, the
electric components including:
a battery that stores power, and
at least one motor that provides a rotational force to at least one of the wheels or the blades based on power received from the battery; and
one or more seals configured to be positioned on the inner frame to prevent the electric components from being exposed to water,
wherein:
the inner frame includes:
a battery receiving recess that opens at the lower surface of the inner frame and is configured to receive the battery therein;
a first sealing rib provided outside of the battery receiving recess and protruding downward from the lower surface of the inner frame in a rectangular box shape; and
a second sealing rib formed in a rectangular box shape and positioned laterally outside the first sealing rib to be at least one of horizontally or longitudinally spaced apart from the first sealing rib,
the lawn mower robot further comprises a battery cover configured to be positioned to close an opening of the battery receiving recess at the lower surface of the inner frame,
the battery cover includes a battery cover sealing rib that protrudes upward along one or more edges of the battery cover and is configured to be inserted between the first sealing rib and the second sealing rib, and
the one or more seals include a battery seal configured to be positioned at an inner surface of the battery cover and to contact a lower end of the first sealing rib when the battery cover is positioned at the battery receiving recess, so as to prevent water from passing between the battery receiving recess and the battery cover.

2. The lawn mower robot of claim 1, wherein the inner frame further includes a plurality of bosses protruding downward and provided between the first sealing rib and the second sealing rib, and
wherein the battery cover sealing rib includes a plurality of coupling holes formed through edges thereof, so that the battery cover sealing rib and the plurality of bosses are coupled together in a vertical direction.

3. A lawn mower robot, comprising:
an outer cover;
an inner frame provided in the outer cover, a plurality of wheels being coupled to a side surface of the inner frame;
a plurality of blades rotatably mounted on a lower surface of the inner frame;
electric components mounted on the inner frame, the electric components including:
a battery that stores power, and
at least one motor that provides a rotational force to at least one of the wheels or the blades based on power received from the battery; and
one or more seals configured to be positioned on the inner frame to prevent the electric components from being exposed to water,
wherein:
the one or more motors includes wheel driving motors configured to provide rotational force to, respectively, the wheels positioned at right and left side surfaces of the inner frame,
the inner frame further includes:
wheel driving motor receiving recesses formed laterally through the right and left side surfaces of the inner frame, respectively;
first sealing ribs extending laterally from the right and left side surfaces of the inner frame, respectively, along a circumferential direction and around the wheel driving motor receiving recesses; and
second sealing ribs protruding laterally from the right and left side surfaces of the inner frame, respectively, along the circumferential direction and positioned to be spaced apart from and radially outside of the first sealing rib,
the lawn mower robot further comprises wheel driving motor housings, each of the wheel driving motor housings accommodating one of the wheel driving motors therein and having a first side contacting an inner surface of a wheel and a second side contacting the inner frame so that the wheel driving motor can be received inside the inner frame through a corresponding one of the wheel driving motor receiving recesses;
a sealing partition wall protruding axially from the second side of the wheel driving motor housing along a circumferential direction, and configured to be inserted between the first sealing rib and the second sealing rib, and
the one or more seals include a wheel driving motor seal configured to be mounted between the first sealing rib and the second sealing rib in a contactable manner with the sealing partition wall, so as to prevent water from passing between the wheel driving motor receiving recesses and the wheel driving motor housing.

4. The lawn mower robot of claim 3, wherein the inner frame further includes:
a water blocking rib positioned radially inside the first sealing rib and protruding axially from the wheel driving motor receiving recesses along the circumferential direction.

5. The lawn mower robot of claim 4, wherein the inner frame further includes:
a plurality of bosses protruding along the circumferential direction and provided between the first sealing rib and the water blocking rib; and
a plurality of extension ribs extending radially outward from outer circumferential surfaces of the bosses.

6. The lawn mower robot of claim 1, wherein:
the one or more motors includes a blade driving motor configured to provide rotational force,
the lawn mower robot further comprises:
an elevating frame having a rotating plate rotatably mounted on a lower surface thereof to rotate the blades, and configured to be mounted in the inner frame to be vertically movable, wherein the blade driving motor is received inside the elevating frame; and
a corrugated tube that is adjustable in length in a vertical direction to correspond to a vertical movement of the elevating frame, and
the one or more seals include a blade seal having one side contacting the inner frame and another side contacting a lower surface of the elevating frame.

7. A lawn mower robot, comprising:
an outer cover;
an inner frame provided in the outer cover, a plurality of wheels being coupled to a side surface of the inner frame;
a plurality of blades rotatably mounted on a lower surface of the inner frame;
electric components mounted on the inner frame, the electric components including:
a battery that stores power, and
at least one motor that provides a rotational force to at least one of the wheels or the blades based on power received from the battery; and
one or more seals configured to be positioned on the inner frame to prevent the electric components from being exposed to water,
wherein the electric components further include a plurality of ultrasonic sensors, and the lawn mower robot further comprises an ultrasonic sensor frame provided on an upper region of the outer cover and having the plurality of ultrasonic sensors mounted therein,
wherein the ultrasonic sensor frame includes:
a frame mount configured to receive the plurality of ultrasonic sensors therein;
a rear cover having an ultrasonic sensor printed circuit board (PCB) to control the plurality of ultrasonic sensors mounted therein, and coupled to cover a rear of the frame mount; and
a front cover positioned at a front of the frame mount, and
wherein the one or more seals includes:
a first ultrasonic sensor seal provided between the front cover and the frame mount; and
a second ultrasonic sensor seal provided between the rear cover and the frame mount.

8. The lawn mower robot of claim 7, wherein the ultrasonic sensor frame includes an anti-vibration cover formed in a cylindrical shape and configured to cover the plurality of ultrasonic sensor, the anti-vibration cover including a coupling hook at a rear end thereof to be coupled to the frame mount and made of a rubber material to absorb vibration generated in the plurality of ultrasonic sensors.

9. A lawn mower robot, comprising:
an outer cover;
an inner frame provided in the outer cover, a plurality of wheels being coupled to a side surface of the inner frame;
a plurality of blades rotatably mounted on a lower surface of the inner frame;
electric components mounted on the inner frame, the electric components including:
a battery that stores power, and
at least one motor that provides a rotational force to at least one of the wheels or the blades based on power received from the battery; and
one or more seals configured to be positioned on the inner frame to prevent the electric components from being exposed to water,
wherein the electric components further include a rain sensor, and
wherein the lawn mower robot further comprises:
a recess formed in one side of an upper region of the outer cover to receive the rain sensor; and
a drain hole having a first end communicating with the recess, and a second end communicating with an inner space of the outer cover such that water in the recess leaves via a lower region of the outer cover through the drain hole.

10. A lawn mower robot, comprising:
an outer cover;
an inner frame provided in the outer cover, a plurality of wheels being coupled to a side surface of the inner frame;
a plurality of blades rotatably mounted on a lower surface of the inner frame;
electric components mounted on the inner frame, the electric components including:
a battery that stores power, and
at least one motor that provides a rotational force to at least one of the wheels or the blades based on power received from the battery; and
one or more seals configured to be positioned on the inner frame to prevent the electric components from being exposed to water,
wherein the electric components further include a user interface (UI), and the inner frame further includes a UI module receiving recess formed in a rear upper region of the inner frame and configured to be opened upward and to receive, therein, a UI module that includes the UI,
wherein the UI module includes:
a liquid crystal display (LCD) module to display information to a user;
a UI printed circuit board (PCB) to control the LCD module; and
a UI cover mounted to cover an upper part of the UI module receiving recess,
wherein the UI module further includes:
a first sealing rib protruding downward from the UI cover; and
a second sealing rib protruding downward from the UI cover and spaced apart from the first sealing rib to be radially outside of the first sealing rib,
wherein the one or more seals includes a UI seal positioned between the first sealing rib and the second sealing rib, and
wherein the inner frame further includes a UI sealing rib protruding upward in a rectangular box shape from an upper region of the UI module receiving recess, and positioned between the first sealing rib and the second sealing rib to be contactable with the UI seal.

11. The lawn mower robot of claim 10, wherein the outer cover includes a cover extension protruding downward from a rear upper region thereof, and
wherein the UI module further includes a dust cover having an upper end contacting the cover extension and a lower end contacting the UI cover to prevent dust in an inner space between the outer cover and the inner frame from penetrating into the UI cover.

12. A lawn mower robot, comprising:
an outer cover;
an inner frame provided in the outer cover, a plurality of wheels being coupled to a side surface of the inner frame;
a plurality of blades rotatably mounted on a lower surface of the inner frame;
electric components mounted on the inner frame, the electric components including:
a battery that stores power, and
at least one motor that provides a rotational force to at least one of the wheels or the blades based on power received from the battery; and one or more seals configured to be positioned on the inner frame to prevent the electric components from being exposed to water, wherein the electric components further include a port configured to enable data to be exchanged between an external device and a central processing unit (CPU) mounted in the inner frame, wherein the inner frame includes an opening at a front of an upper region thereof and communicating with the port, wherein the lawn mower robot further comprises:
- a connector cover configured to be positioned over the opening communicating with the port;
- a mounting rib protruding downward along one or more edges of the connector cover; and
- a sealer mounting groove formed between an outer region of the connector cover and the mounting rib, wherein the one or more seals include a connector seal mounted along the sealer mounting groove, and wherein the inner frame further includes a rib protruding upward in a rectangular box shape along a circumference of the opening to be contactable with the connector sealer.

13. A lawn mower robot, comprising:
an outer cover;
an inner frame provided in the outer cover, a plurality of wheels being coupled to a side surface of the inner frame;
a plurality of blades rotatably mounted on a lower surface of the inner frame;
electric components mounted on the inner frame, the electric components including:
- a battery that stores power, and
- at least one motor that provides a rotational force to at least one of the wheels or the blades based on power received from the battery; and one or more seals configured to be positioned on the inner frame to prevent the electric components from being exposed to water, wherein the inner frame further includes:
- an inner frame main carriage configured to receive the electric components therein;
- an inner frame cover configured to be positioned over an upper region of the inner frame main carriage;
- a first sealing protrusion protruding downward from an outer region of the inner frame cover; and
- a second sealing protrusion spaced apart from the first sealing protrusion at an outside of the first sealing member in an overlapping manner in at least one of a back-and-forth direction or a right-and-left direction, wherein the one or more seals include a body seal positioned between the first sealing protrusion and the second sealing protrusion along edges of the inner frame cover to regulate air flow between the inner frame main carriage and the inner frame cover, and wherein an upper end region of the inner frame main carriage is located between the first sealing protrusion and the second sealing protrusion and overlaps the first sealing protrusion and the second sealing protrusion in one or more of the back-and-forth direction or the right-and-left direction of the inner frame.

14. The lawn mower robot of claim 13, wherein the inner frame cover includes a plurality of coupling tabs formed along edges thereof and spaces apart from each other, and the plurality of coupling tabs are positioned outside the body seal.

15. A lawn mower robot, comprising:
an outer cover;
an inner frame provided in the outer cover, a plurality of wheels being coupled to a side surface of the inner frame;
a plurality of blades rotatably mounted on a lower surface of the inner frame;
electric components mounted on the inner frame, the electric components including:
- a battery that stores power, and
- at least one motor that provides a rotational force to at least one of the wheels or the blades based on power received from the battery;

one or more seals configured to be positioned on the inner frame to prevent the electric components from being exposed to water;
a first top cover rotatably coupled to an upper region of the outer cover by a first hinge; and
a second top cover rotatably coupled to a rear region of the outer cover by a second hinge, wherein the first top cover is configured to be inclined downward from a central region toward right and left end regions in right-and-left direction, and configured to be inclined downward from a rear end region to a front side in a back-and-forth direction, and wherein the second top cover is configured to be inclined downward from a central region toward the right and left end regions in the right-and-left direction, and configured to be inclined downward from a front end region to a rear side in the back-and-forth direction.

16. A lawn mower robot, comprising:
an outer cover;
an inner frame provided in the outer cover;
one or more driving wheels positioned at side surfaces of the inner frame and receiving a driving force to move the lawn mower robot; and
one or more blades rotatably mounted on a lower surface of the inner frame, wherein the inner frame includes:
- an inner frame main carriage configured to receive one or more electric components therein;
- an inner frame cover configured to be positioned over an upper region of the inner frame main carriage;
- a first sealing protrusion protruding downward from an outer region of the inner frame cover;
- a second sealing protrusion spaced apart from the first sealing protrusion at an outside of the first sealing member in an overlapping manner in at least one horizontal direction; and
- a seal positioned between the first sealing protrusion and the second sealing protrusion along edges of the inner frame cover to regulate air flow between the inner frame main carriage and the inner frame cover.

17. The lawn mower robot of claim 16, wherein an upper end region of the inner frame main carriage is located between the first sealing protrusion and the second sealing protrusion and overlaps the first sealing protrusion and the second sealing protrusion in one or more of a back-and-forth direction or a right-and-left direction of the inner frame.

18. The lawn mower robot of claim 16, wherein the inner frame further includes:
- a battery receiving recess that opens at the lower surface of the inner frame and is configured to receive a battery therein;
- a first sealing rib provided outside of the battery receiving recess and protruding downward from the lower surface of the inner frame in a rectangular box shape;

a second sealing rib formed in a rectangular box shape and positioned laterally outside the first sealing rib to be at least one of horizontally or longitudinally spaced apart from the first sealing rib;

a battery cover configured to be positioned to close an opening of the battery receiving recess at the lower surface of the inner frame, wherein the battery cover includes a battery cover sealing rib that protrudes upward along one or more edges of the battery cover and is configured to be inserted between the first sealing rib and the second sealing rib; and a battery seal configured to be positioned at an inner surface of the battery cover and to contact a lower end of the first sealing rib when the battery cover is positioned at the battery receiving recess, so as to prevent water flow between the battery receiving recess and the battery cover.

19. The lawn mower robot of claim 16, further comprising:

an elevating frame having a rotating plate rotatably mounted on a lower surface thereof to rotate the blades, and configured to be mounted in the inner frame to be vertically movable, wherein a blade driving motor is received inside the elevating frame;

a corrugated tube configured to be adjustable in length in a vertical direction to correspond to a vertical movement of the elevating frame; and a blade seal having one side contacting the inner frame and another side contacting a lower surface of the elevating frame.

20. The lawn mower robot of claim 15, wherein:

the one or more motors includes a blade driving motor configured to provide rotational force, the lawn mower robot further comprises:

an elevating frame having a rotating plate rotatably mounted on a lower surface thereof to rotate the blades, and configured to be mounted in the inner frame to be vertically movable, wherein the blade driving motor is received inside the elevating frame; and a corrugated tube that is adjustable in length in a vertical direction to correspond to a vertical movement of the elevating frame, and the one or more seals include a blade seal having one side contacting the inner frame and another side contacting a lower surface of the elevating frame.

* * * * *